United States Patent [19]

Smith et al.

[11] Patent Number: 5,539,187

[45] Date of Patent: Jul. 23, 1996

[54] MICROWAVE OVEN FOR HEATING FOOD PRODUCTS

[75] Inventors: Donald P. Smith, Dallas; Michael J. Dobie, Double Oak; Alden B. Sparman, Sr.; John R. Norris, both of Plano, all of Tex.

[73] Assignee: Patentsmith Corportion, Dallas, Tex.

[21] Appl. No.: 410,486

[22] Filed: Mar. 24, 1995

Related U.S. Application Data

[60] Division of Ser. No. 958,968, Oct. 9, 1992, Pat. No. 5,401,940, which is a continuation-in-part of Ser. No. 723,250, Jun. 28, 1991, Pat. No. 5,210,387, which is a continuation-in-part of Ser. No. 463,279, Jan. 10, 1990, Pat. No. 5,147,994.

[51] Int. Cl.⁶ .................................................... H05B 6/64
[52] U.S. Cl. .................... 219/681; 219/679; 219/400; 99/473; 126/21 A; 221/150 R
[58] Field of Search ............................. 219/679, 681, 219/685, 388, 400, 725, 734, 762; 99/443 C, 427, DIG. 14, 475, 473, 355, 357; 221/150 A, 150 R, 150 HC; 126/21 A, 21 D; 426/241, 243

[56] References Cited

U.S. PATENT DOCUMENTS

| | | | |
|---|---|---|---|
| 3,333,666 | 8/1967 | Murray et al. | 99/355 |
| 3,343,479 | 9/1967 | Wassberg | 219/400 |
| 3,386,550 | 6/1968 | Murray et al. | 99/355 |
| 3,397,817 | 8/1968 | Smith | 219/10.55 A |
| 3,534,676 | 10/1970 | Rubino | 99/355 |
| 3,884,213 | 5/1975 | Smith | 126/21 A |
| 4,004,712 | 1/1977 | Pond | 219/10.55 B |
| 4,154,861 | 5/1979 | Smith | 426/466 |
| 4,289,792 | 9/1981 | Smith | 426/241 |
| 4,398,651 | 8/1983 | Kumpfer | 219/10.55 R |
| 4,409,453 | 10/1983 | Smith | 219/679 |
| 4,481,396 | 11/1984 | Matsubayashi et al. | 219/681 |
| 4,591,683 | 5/1986 | Eke | 219/681 |
| 4,592,485 | 6/1986 | Anderson et al. | 219/10.55 R |
| 4,728,762 | 3/1988 | Roth et al. | 219/681 |
| 4,762,250 | 8/1988 | Fiberg | 221/123 |
| 4,783,582 | 11/1988 | Wada et al. | 219/10.55 R |
| 4,784,292 | 11/1988 | Johndrow et al. | 99/357 |
| 4,835,351 | 5/1989 | Smith et al. | 219/10.55 R |
| 5,147,994 | 9/1992 | Smith et al. | 219/681 |
| 5,210,387 | 5/1993 | Smith et al. | 219/686 |
| 5,310,978 | 5/1994 | Smith et al. | 219/681 |
| 5,401,940 | 3/1995 | Smith et al. | 219/679 |
| 5,423,248 | 6/1995 | Smith et al. | 99/443 C |

*Primary Examiner*—Tu Hoang
*Attorney, Agent, or Firm*—Crutsinger & Booth

[57] ABSTRACT

Apparatus for transferring heat between temperature controlled air dispensed from a pair of oscillating ducts and a food product in a cabinet having an interior compartment bounded by front, side and rear walls. A foraminous partition, having a central portion and extremities, is mounted to divide the interior of the cabinet into a cooking chamber and an air conditioning chamber. It is configured to encircle a portion of the cooking chamber such that the air conditioning chamber extends around a major part of the periphery of the cooking chamber wherein air is drawn along multiple paths toward side walls and toward the rear wall from the cooking chamber.

19 Claims, 22 Drawing Sheets

MICROWAVE OVEN FOR HEATING FOOD PRODUCTS

CROSS REFERENCE TO RELATED APPLICATIONS

This is a division of application Ser. No. 07/958,968 filed Oct. 9, 1992 which is now U.S. Pat. No. 5,401,940 and is a continuation-in-part of application Ser. No. 07/723,250, filed Jun. 28, 1991, now U.S. Pat. No. 5,210,387 entitled "FOOD HANDLING SYSTEM" which is a continuation-in-part of application Ser. No. 07/463,279 filed Jan. 10, 1990, now U.S. Pat. No. 5,147,994 entitled "MICROWAVE VENDING MACHINE."

TECHNICAL FIELD

The invention relates to improvements in recirculating air convection ovens for heating food products.

BACKGROUND OF INVENTION

In heavy duty foodservice ovens and food vending machines, cleaning is a major consideration. This is particularly important in air recirculating impingement ovens of the type disclosed in U.S. Pat. No. 3,884,213 and in convection ovens with microwave food heating.

U.S. Pat. No. 3,884,213 discloses an oven equipped with a pivotally mounted, rectangular shaped, microwave transparent plate having spaced tubes extending therethrough for forming collimated jets of air that are projected to impinge upon surfaces of a food product. While the disclosed oven provided significant improvements in the transfer of heat to the food product, it was difficult to clean and maintain. Further, the shape and mounting for the jet plate did not permit optimum air flow to provide maximum efficiency and required that the jet plate be microwave transparent.

Vending machines for dispensing hot and cold drinks, candy, cookies, potato chips and other snack foods have enjoyed significant commercial success. However, vending machines for dispensing meals have been limited to dispensers of refrigerated foods such as sandwiches, salads and the like.

Devices heretofore devised for incorporating electronic ovens in food vending machines are disclosed in U.S. Pat. No. 3,333,666; U.S. Pat. No. 3,343,479; U.S. Pat. No. 3,386,550; U.S. Pat. No. 3,397,817; U.S. Pat. No. 3,534,676; U.S. Pat. No. 4,004,712; U.S. Pat. No. 4,398,651; U.S. Pat. No. 4,592,485; U.S. Pat. No. 4,762,250; U.S. Pat. No. 4,783,582 and U.S. Pat. No. 4,784,292.

Vending machines for hot meals generally include a refrigerated compartment for preserving food, a microwave oven compartment for fast cooking, and a conveyor for transferring food from the refrigerated compartment into the microwave oven. However, since vending machines for hot foods have enjoyed very limited commercial success, separate microwave ovens for heating food items removed from a refrigerator are commonly employed in convenience stores, airports, cafeterias and other food vending operations.

Microwave heating of certain foods, including pizza and sandwiches that contain dough and bakery products, typically leaves the surface too moist and less palatable than similar food products cooked in other types of ovens.

Ovens of the type disclosed in U.S. Pat. No. 3,884,213; U.S. Pat. No. 4,154,861; U.S. Pat. No. 4,289,792; U.S. Pat. No. 4,409,453 and U.S. Pat. No. 4,835,351 employ air jets which impinge upon the surface of a food product to provide surface heating of the product in combination with microwave heating. Jet impingement ovens have enjoyed significant success in commercial food service and commercial food processing operations. However, a long felt need exists for apparatus for quickly and efficiently heating food products that require little or no preparation for use in a vending machine for hot meals and in counter top ovens for food-service operations that are easily cleaned.

SUMMARY OF INVENTION

A preferred embodiment of the apparatus to transfer heat between streams of recirculating air and a food product includes an oven cabinet having an interior divided by a foraminous plate to prevent transfer of microwave energy from a cooking chamber to an air conditioning chamber in the cabinet. The air conditioning chamber houses air circulating apparatus to recirculate temperature controlled air from the air conditioning chamber through the cooking chamber to facilitate crisping and browning to provide a desired surface texture. The foraminous partition has extremities spaced from and extending along sides of the oven such that recirculating air is drawn along multiple paths to the air circulating apparatus.

Microwave heating apparatus communicates with the cooking chamber to provide rapid heating of the food by electro-magnetic excitation. Air dispensing ducts are mounted by a coupling which permits oscillation of the ducts about an axis to diffuse microwaves in the cooking chamber and to sweep collimated air streams across the surface of the food product.

In one embodiment of the invention, a method for controlling the temperature and surface texture of a product includes the steps of: positioning a product in a container having upwardly extending sides and a bottom; positioning the product and container in a temperature controlled atmosphere; supporting the product above the bottom of the container; and forming a region of controlled air pressure alternately adjacent opposite sides of the product by directing air to flow alternately adjacent opposite sides of the product such that temperature controlled air flows between the lower surface of the product and the bottom of the container.

DESCRIPTION OF DRAWINGS

Drawings of a preferred embodiment of the microwave vending machine are annexed hereto so that the invention may be better-and more fully understood, in which.

Numeral references are employed to designate like parts throughout the various figures of the drawing.

DESCRIPTION OF PREFERRED EMBODIMENT

Figure 13:
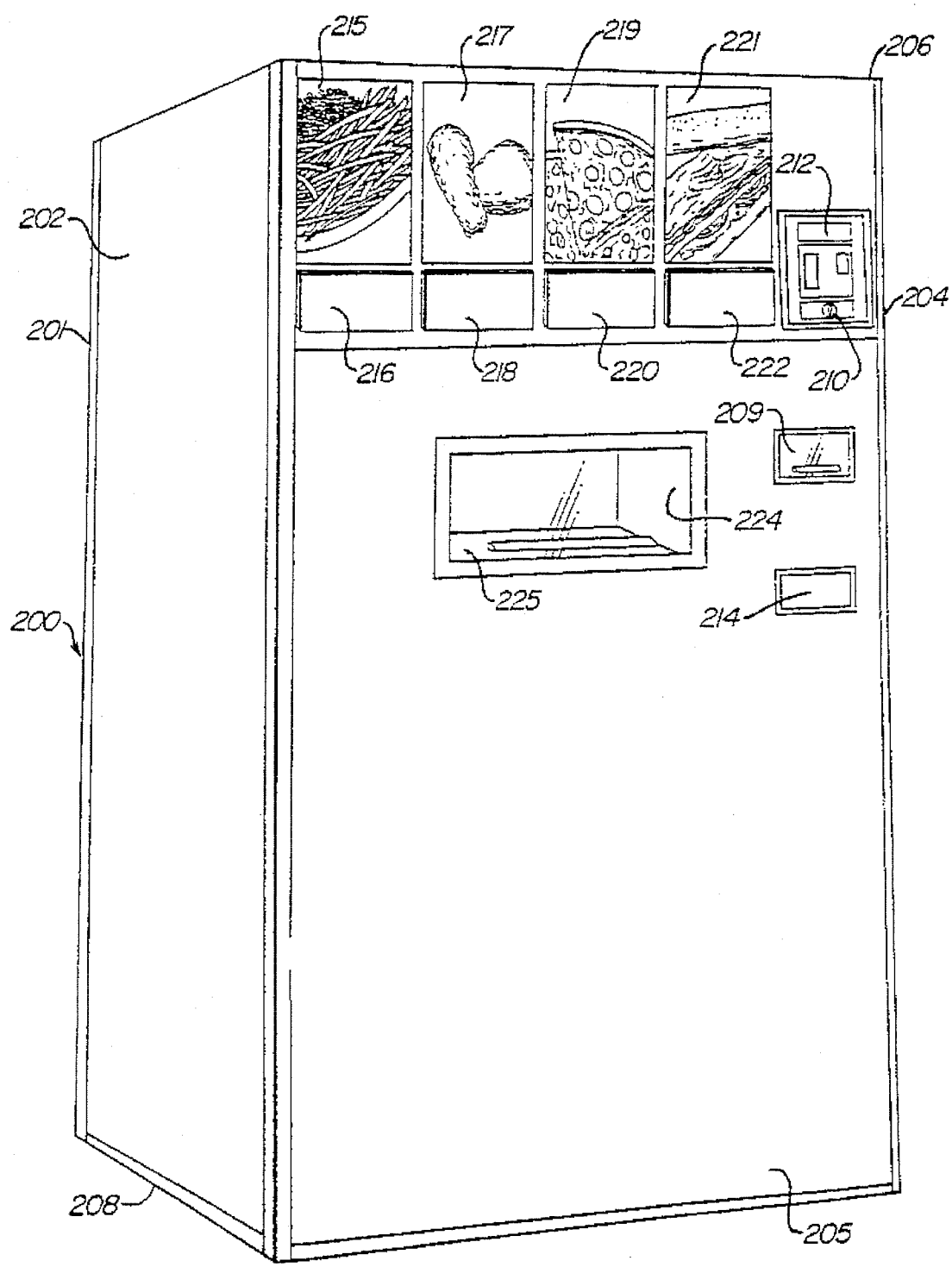
FIG. 13 is a perspective view of the external vending machine cabinet.

Referring to FIGS. 1, 4, 7 and 13 of the drawings, the numeral 10 generally designates a package that is moved by package handling apparatus 40 into and out of an oven 70 in a vending machine 200. As will be hereinafter more fully explained, a source 90 of electromagnetic radiation and air circulating apparatus 100 are employed for heating a food product 30 selected by a consumer upon depositing the purchase price of the food product in the vending machine 200 illustrated in FIG. 13. As best illustrated in FIG. 13 of the drawing, the vending machine 200 is preferably adapted to serve, for example, hot food products 30 to a customer within about one and a half to two minutes. In the illustrated embodiments, the food products 30 may, for example, include french fried potatoes, chicken nuggets, pizza, submarine sandwiches, bread and other baking products.

The vending machine 200 is mounted in an enclosure cabinet having a back wall 201, spaced side walls 202 and 204, a front panel 205, a top wall 206 and a bottom wall 208. The front panel 205 is preferably hingedly secured to side wall 202 and provided with a key actuated lock 210 securing the front panel 205 in a closed and locked position to prevent unauthorized access to the interior of the enclosure. A currency receiving mechanism 212 adapted to accept both coins and bills is mounted on front panel 205 along with a coin return slot 214 for returning change to the customer.

Selector plates 216, 218, 220 and 222 are mounted on the front panel 205 for use by the customer to designate the food item selected to be heated and dispensed through a delivery passage 224 closed by a protective door 225. Product identification panels 215, 217, 219 and 221 are associated with selector plates 216, 218, 220 and 222, respectively, to inform the customer what food item can be selected by touching one of the selector plates. Identification panel 215 is provided with a graphic illustration of fried potatoes permitting use of the vending machine 200 by persons who do not speak or read a particular language. Additional indicia including words, numerals or other and graphic representations may be applied to each of the panels 215, 217, 219 and 221.

A condiment holding chamber 209 is provided for holding packets of salt, pepper, sugar, ketchup, mustard and barbecue sauce.

As will be hereinafter more fully explained, a refrigerated food storage cabinet 170 is preferably mounted in the lower portion of the interior of the vending machine enclosure 200 and package handling apparatus 40 and oven 70 are mounted above and adapted to receive selected packages of food products from the refrigerated storage compartment 170 transported by an elevator 180.

Each selector plate 216, 218, 220 and 222 is preferably connected to an electrical circuit adapted to initiate a sequence of events provided that payment for the food item 30 has been received in the currency receiving mechanism 212. As will be hereinafter more fully explained, touching selector plate 220 indicates that pizza, graphically illustrated on product identification panel 219 is to be dispensed. A container 10 containing pizza will be automatically moved from the refrigerated storage compartment 170 onto an elevator 180 and delivered to the package handling apparatus 40 which will move the package 10 to oven 70 for heating and then dispense the heated product 30 through the delivery passage 224 which is accessible to the customer by raising door 225.

The electrical circuit controlling the heating of the selected food product 30 preferably includes three programmed elements for delivering a predetermined type of heating for a pre-programmed time interval to the selected food product. The programmable circuit preferably includes, for example, devices to program the heating cycle by coordination with the location of the selected food item in the storage compartment 170, a bar code or other readable mechanism on the package, and symbols displayed on or adjacent selector plates 216–222 for the user to touch. From the foregoing, it should be readily apparent that touching one of the selector plates 216, 218, 220 or 222 based on the visual selection of a food item graphically illustrated on product identification panels 215, 217, 219 or 221 initiates a programmed sequence to control the heating cycle of the selected food product 30.

Figure 7:
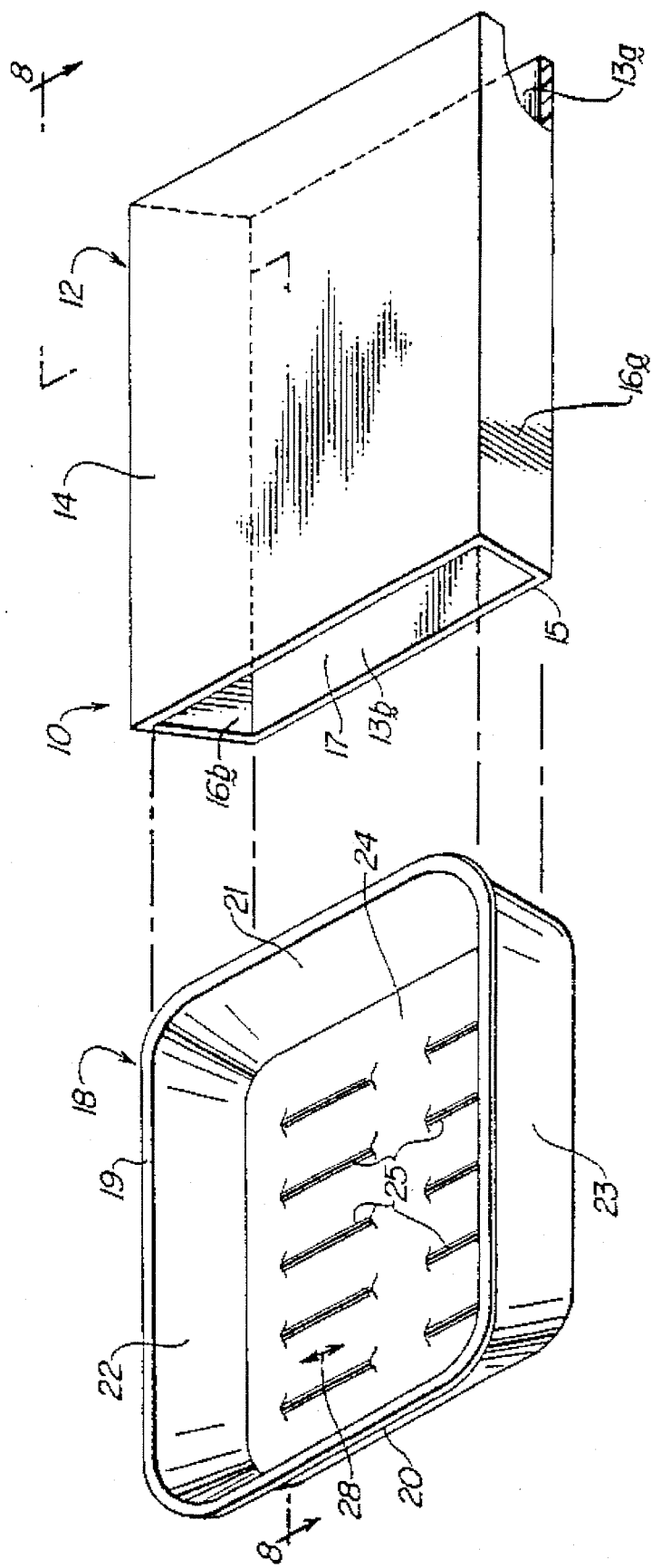
FIG. 7 is an exploded perspective view of a container and protective sleeve that form a package for a food product.
Figure 8:
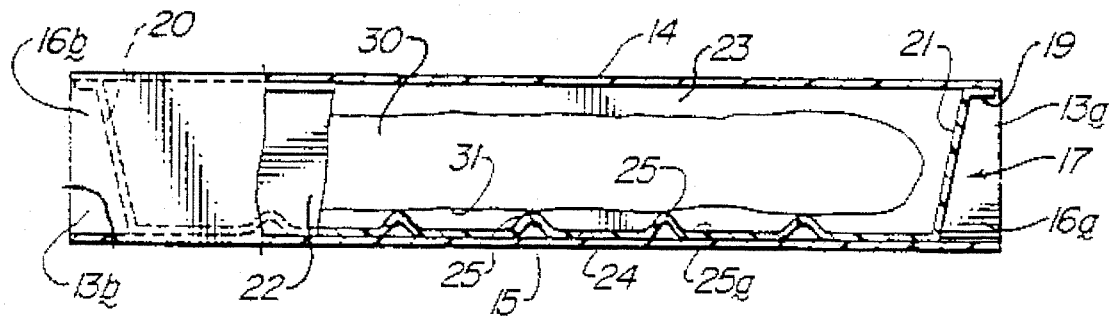
FIG. 8 is an elevational view of the package illustrated in FIG. 7, parts being broken away to more clearly illustrated details of construction.

Package 10, best illustrated in FIGS. 7 and 8, comprises a tubular sleeve 12 having open ends 13*a* and 13*b*. Sleeve 12 is formed by a top 14, bottom 15 and side walls 16*a* and 16*b* having peripheral edges connected to form an interior cavity 17 for a container 18. Bottom 15 is narrower than top 14 and side walls 16*a* and 16*b* are inclined relative to vertical planes.

Container 18 is an open topped tray formed by side walls 20 and 21 having end walls 22 and 23 secured between opposite ends thereof and a bottom wall 24. Support ribs 25 or other suitable projections extend upwardly from bottom wall 24 for supporting a food product 30 spaced from bottom wall 24 to provide space forming a path 28 extending between the lower surface 31 of the food product 30 and the upper surface 25*a* of the bottom wall 24 of container 18.

The package 10 carries the food product 30 in the open-top container 18 which is enclosed in the tube-like sleeve 12. The food product 30 is stored in a cabinet 170 in the container 18 inside of the sleeve covers 12. The container 18 is withdrawn from the sleeve 12 prior to heating the food product 30 and then the food 30 and container 18 are returned to the sleeve 12 to retain heat in the food until the package 10 is opened by the customer.

It should be readily apparent that refrigeration of food product 30 may not be necessary if food product 30 is not perishable or if package 10 containing the food product has been treated to assure that food product 30 has sufficient shelf life. Cabinet 170 may be refrigerated or divided into compartments, some of which are refrigerated depending upon the nature of the food product to be dispensed by the vending machine 200.

The relatively non-conducting sleeve 12 serves as a comfortable holder for the hot container 18 and food 30.

The cover for the container 18, having a lip 19 which extends around the periphery of upper edges of walls 20, 21, 22 and 23, is formed by the top 14 of sleeve 12 to provide a slip-over lid which covers the open top of the container 18 and can be removed for heating and subsequently provides insulated cool handling of the hot product 30 by enclosing the lip 19 of the container 18.

Figure 9:
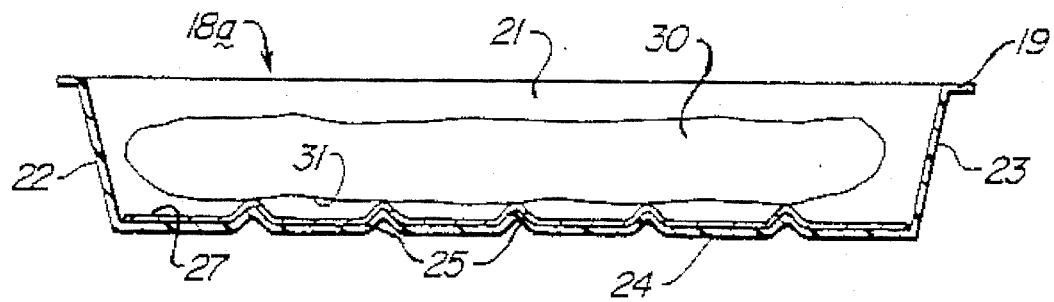
FIG. 9 is a fragmentary diagrammatic view illustrating a modified form of a food container having susceptor film mounted therein.

In FIG. 9 of the drawing, the numeral 18*a* generally designates a modified form of the container having a susceptor belt 27 mounted adjacent bottom 24 of the container having ribs 25 formed thereon. The susceptor belt is formed of polyethylene terephthalate and is commercially available from a variety of sources including Frigigold of England and is recommended for use in reusable plastic or paperboard microwave cook ware in a recommended temperature range of up to 450° F. The susceptor belt 27 is rapidly heated by microwave energy until it reaches a maximum temperature of, for example, 350° F. and the temperature level is maintained to provide radiant and conductive bottom heat to the food product 30.

Figure 10:
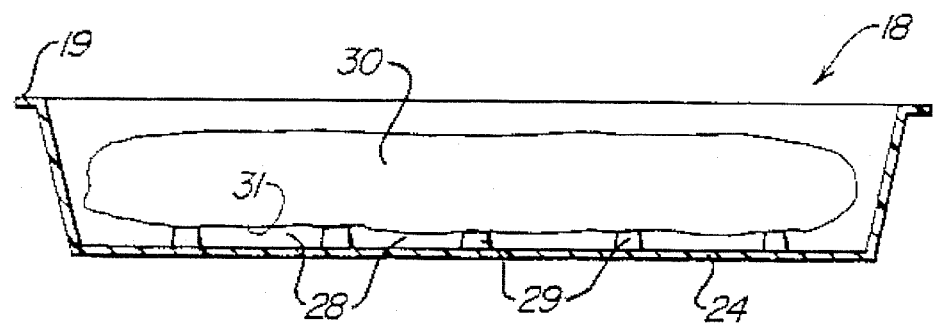
FIG. 10 is a fragmentary diagrammatic view of a food container having a bottom layer of french fried food material and an upper layer of a different food product.

In the embodiment of the container 18 illustrated in FIG. 10 of the drawing, a layer 29 of a particulate food product, such as strips of pasta or slices of potato, is positioned between the bottom wall 24 of container 18 and the lower surface 31 of food product 30. If layer 29 is slices of potato and product 30 is a meat product, juices dripping from the lower surface of food product 30 will contact and be absorbed by layer 29 of potato slices to enhance the cooking of both the slices of potato and the meat product 30. The liquid juices enhance the flavor and appearance of the potatoes while the circulation of air through passages 28 between the potato slices results in controlled drying and evaporation of moisture from the bottom of the food product 30 to provide an acceptable texture, taste, smell and appearance superior to that conventionally achieved in microwave ovens.

As illustrated in FIGS. 15–21 of the drawing, the food product 30*a* may comprise particulate material, such as slices of fried potatoes and a corrugated susceptor belt 27 is mounted adjacent bottom 24 to form ribs 25. Since the susceptor belt 27 is controllably heated by the microwave and portions of the upwardly extending ribs 25 contact the lower surface of the food product, the structure simulates grilling as well as allowing juices to flow into the area between the ribs.

Figure 15:
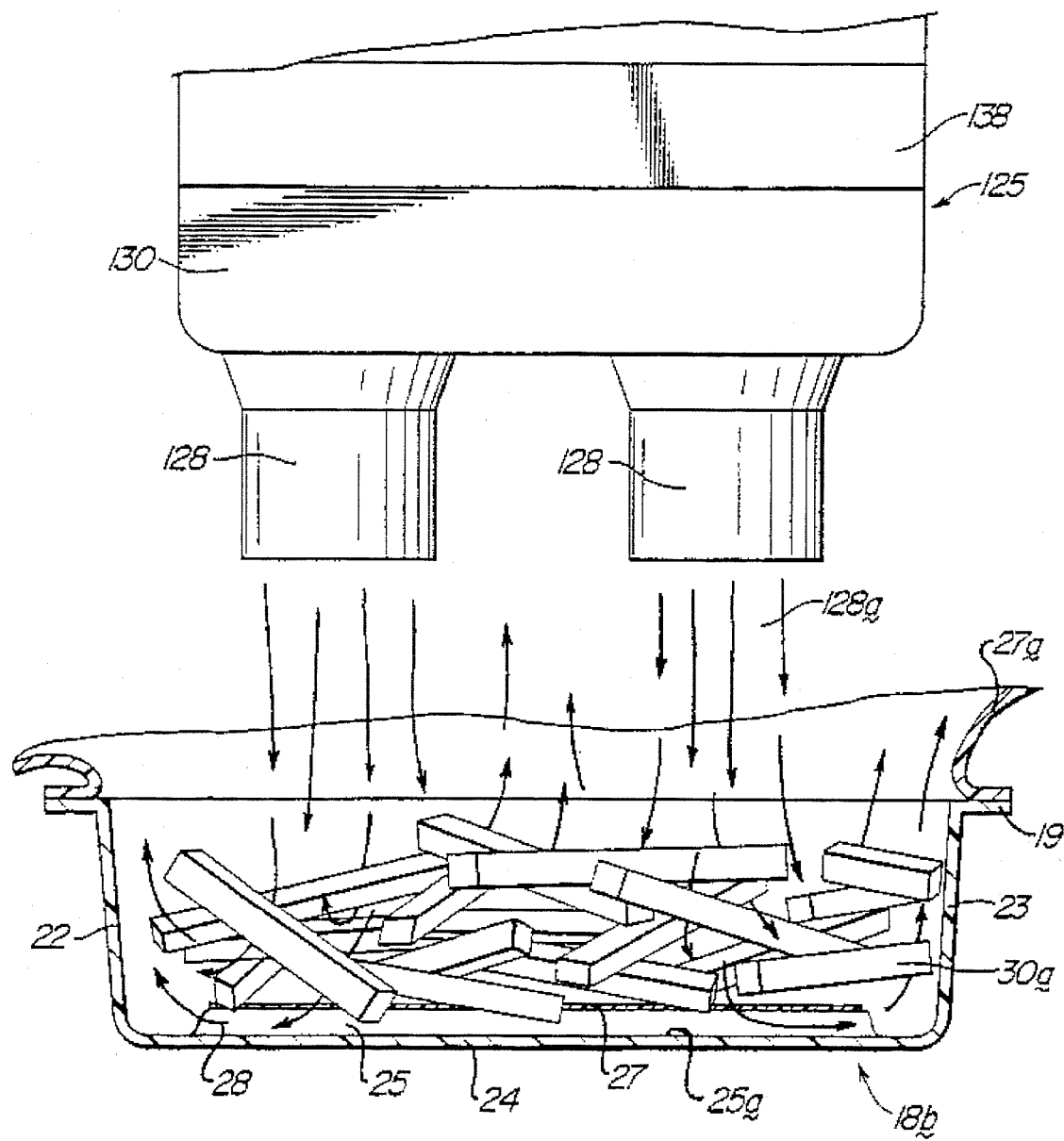
FIG. 15 is a diagrammatic view similar to FIG. 11 illustrating air flow through a particulate food product.
Figure 16:
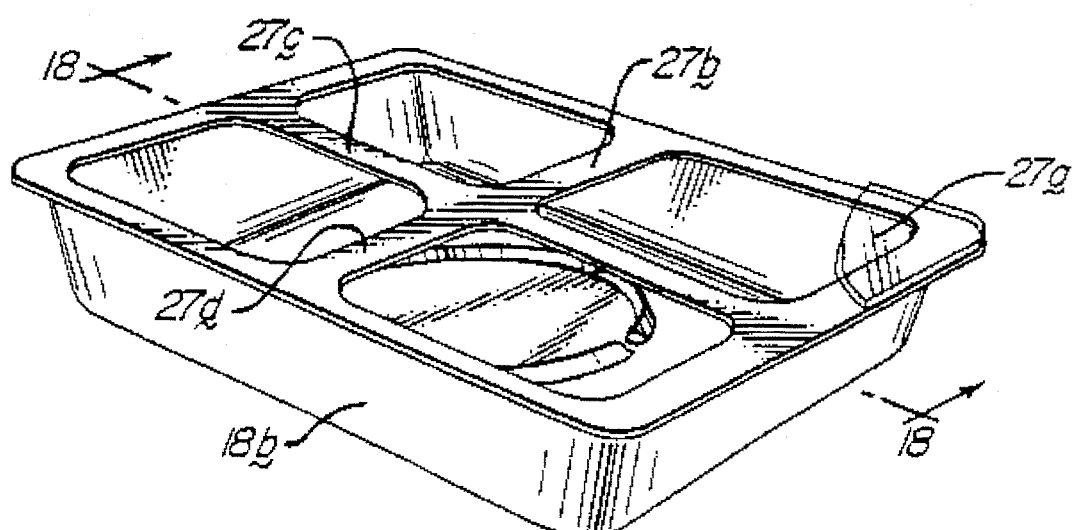
FIG. 16 is a perspective view of a container having a lattice bridging the open top thereof.
Figure 17:
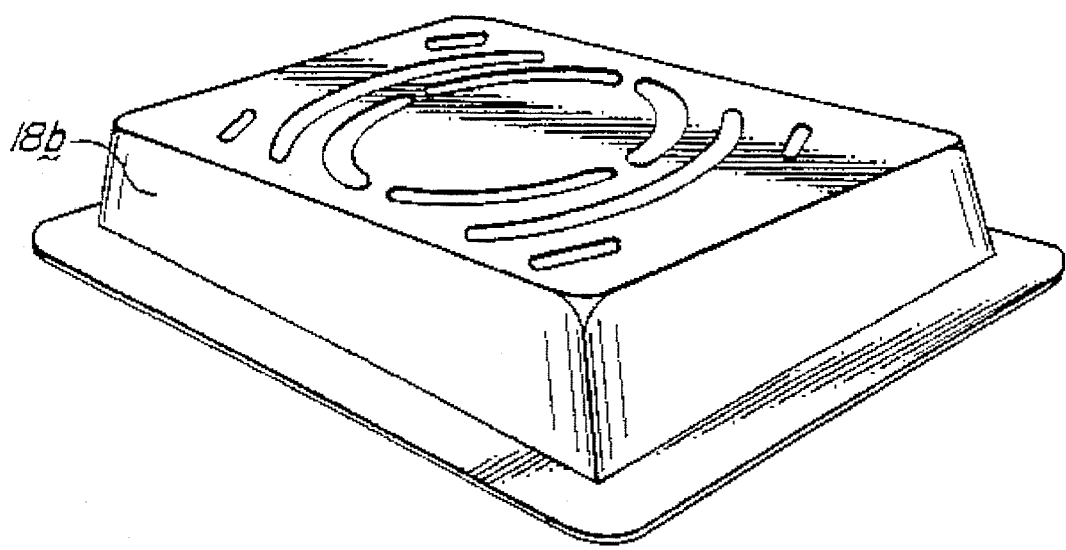
FIG. 17 is a perspective view of the bottom of the container illustrated in FIG. 16.
Figure 18:
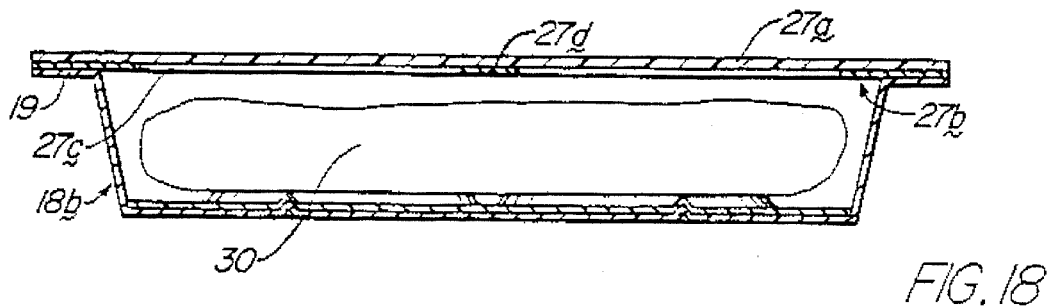
FIG. 18 is a cross-sectional view taken along line 18—18 of FIG. 16.

Container 18*b*, illustrated in FIG. 15, is provided with a sheet 27*a* of a heat shrinkable film bonded to lip 19 for sealing the food product 30*a* in the container 18*b*. A sheet 27*a* preferably formed of polymeric compounds and materials, for example, synthetic thermoplastic resins of the type which are commercially available from E. I. DuPont de Nemours and Co. of Wilmington, Del., used to form a polyethylene film which will shrink when contacted by air at a temperature of less than 400° F. which results in film 27*a* becoming perforated and shrinking toward lip 19 which extends around the periphery of container 18*b*. The cohesive nature of the polyethylene material prevents it from dripping into the food container. It should be readily apparent that the use of the polyethylene film 27*a* provides a seal which prevents deterioration of food product 30*a* over an extended period of time in a refrigerator or freezer.

A perforated grid or lattice 27*b*, illustrated in FIG. 16 and FIGS. 18–21, may be mounted between the upper surface of lip 19 and the lower surface of sheet 27*a*. Legs 27*c* and 27*d* spanning across the top of container 18*b* support film 27*a* to assure that portions of film 27*a* do not drop downwardly to engage the food product 30*a* in container 18*b*.

As diagrammatically illustrated in FIGS. 18–21 of the drawing, film 27*a* and lattice 27*b* are bonded or otherwise sealingly secured to the lip 19 which extends around the periphery of the open top of container 18*b* to prevent dehydration and to otherwise protect food product 30*a* in container 18*b*. Food product 30 is supported on susceptor belt 27 having upwardly extending projections 25 formed thereon for spacing the lower surface of food product 30 above the bottom of container 18*b* to form air passages therebetween as hereinbefore described.

Figure 19:
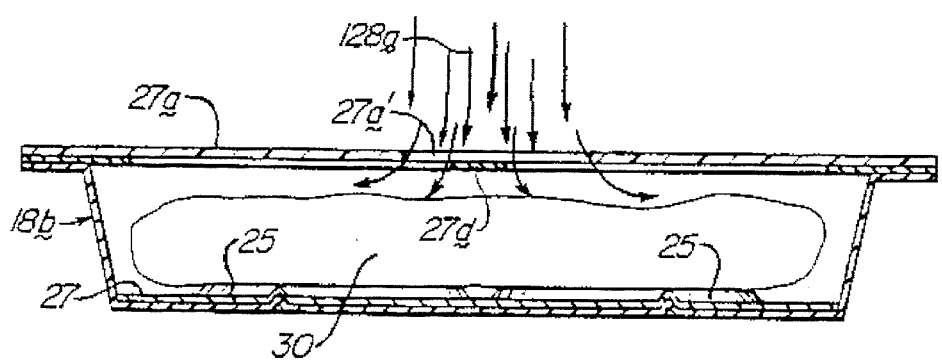
FIGS. 19–21 are cross-sectional views similar to FIG. 18 diagrammatically illustrating the progressive heating of a film sealing the container to uncover a food product in the container.

As illustrated in FIG. 19 of the drawing, impingement of air stream 128*a* against the upper surface of film 27*a* causes a central portion of film 27*a* to be perforated forming an opening 27*a*' in a central portion of the film intermediate edges of container lab.

Figure 20:
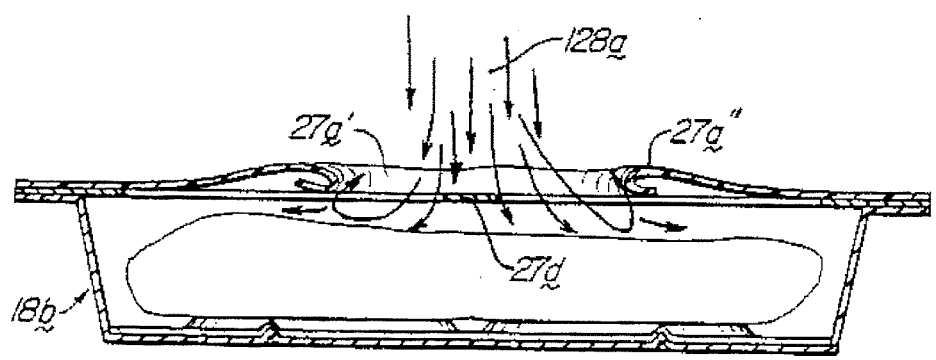

As illustrated in FIG. 20, opening 27*a*' is enlarged as heat is transferred to the film 27*a* which tends to roll back as indicated at 27*a*" as the film material shrinks and is distorted.

Figure 21:
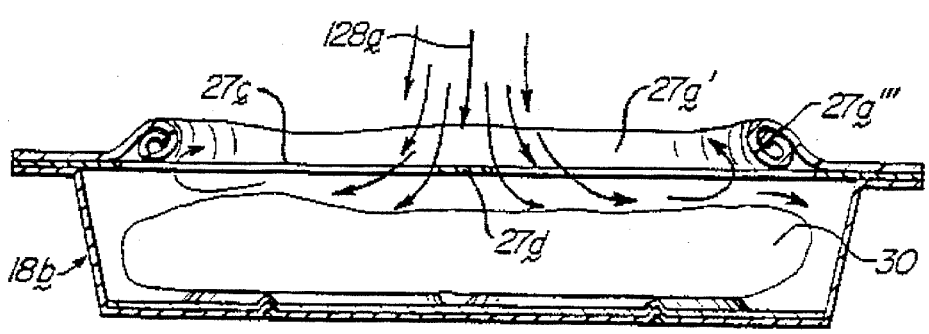

As illustrated in FIG. 21 of the drawing, heat transferred to the film 27*a* causes the meltable and shrinkable film 27*a* to retract to the position designated 27*a*''' thereby uncovering the upper surface of food product 30 in container 18*b*.

It should be appreciated that container 18*b* is preferably stored in a tubular sleeve 12 of the type hereinbefore described to prevent perforation of sealing film 27*a* during handling of containers while being transported for stocking storage cabinet 170. As will be hereinafter more fully explained, after container 18bb has been moved into heat exchange relation with streams 128a of heated air projected by air circulating apparatus 100, container 18b is reinserted into the tubular sleeve 12 prior to dispensing the food product to the customer so that the hot container 18b and the food product 30 therein can be handled by the customer to eliminate the necessity for providing "hot pads" or other apparatus for handling the hot container.

Figure 1:
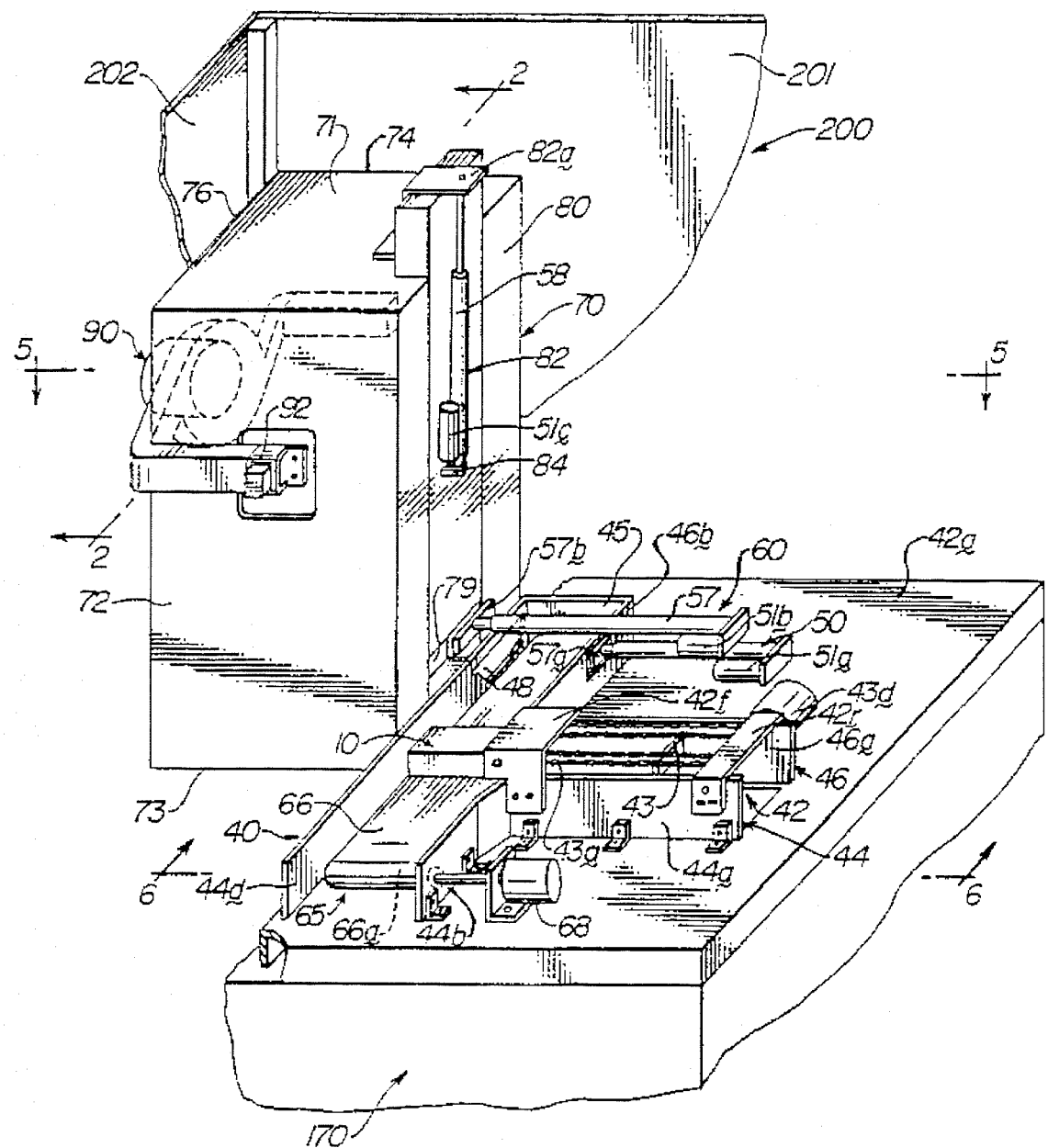
FIG. 1 is a perspective view of a package handling apparatus and oven cabinet inside a vending machine, the outer cabinet of the vending machine being broken away to more clearly illustrate details of construction.
Figure 14:
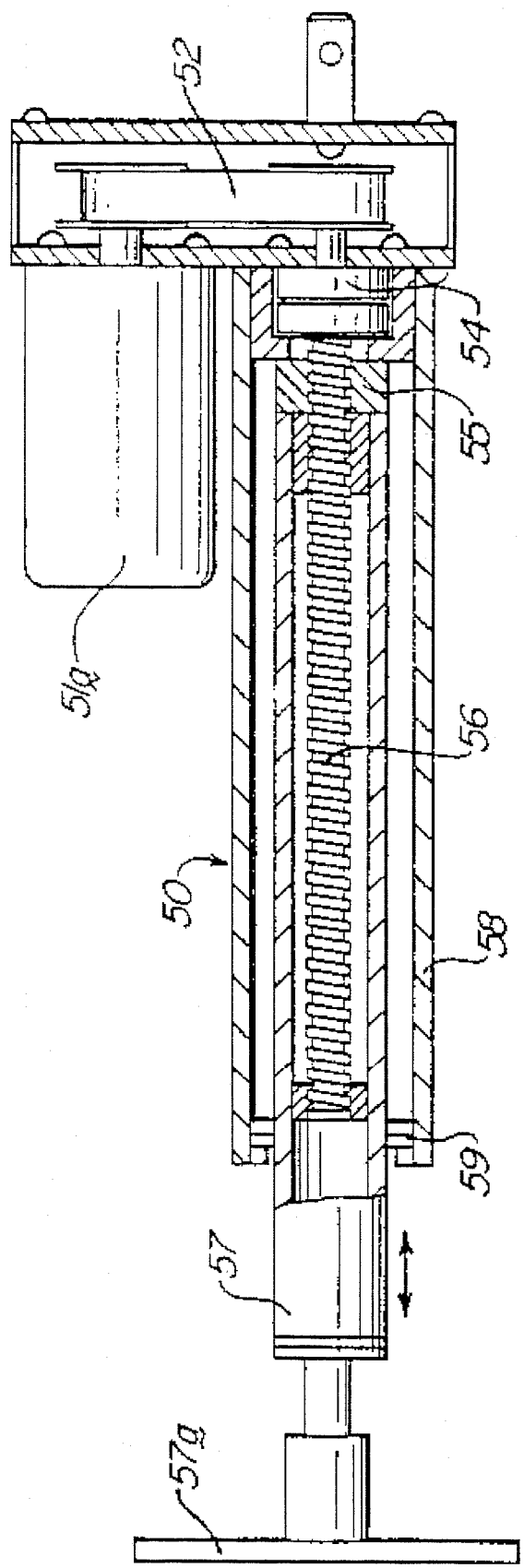
FIG. 14 is a cross sectional view taken through the electro-mechanical linear actuator.

As best illustrated in FIGS. 1 and 14, package handling apparatus 40 includes a container loading device 50 and a container unloading device 60. The loading device 50 and unloading device 60 are of substantially identical construction and comprise motors 51a and 51b, respectively, drivingly connected through synchronous drive belts 52 to the end of drive screws 56. Each drive screw 56 has threads formed on the outer surface thereof which engage internal threads in a drive nut 55 which moves linearly along drive screw 56 as the drive screw rotates. Thrust is transmitted from the drive nut 55 to a translating tube 57. The entire screw 56 and nut 55 assembly is protected from contamination and environmental elements by a cover tube 58, and an end wiper seal 59. Rotational thrust bearings 54 allow the screw 56 to freely rotate under loaded conditions.

The electro-mechanical linear actuators 50 and 60 are commercially available from Jasta, Inc. of San Jose, Calif. and from Dayton Electric Manufacturing Co. of Chicago, Ill., and form no part of the invention except in the claimed combination.

Motors 51a and 51b are preferably variable speed reversible synchronous gear motors. It should be readily apparent that motors 51a and 51b transmit torque through belt 52 for rotating drive screws 56. Rotation of drive screw 56 causes drive nut 55 which is secured to the inner end of translating tube 57 to move translating tube 57 to extend or retract tube 57 relative to cover tube 58.

Figure 5:
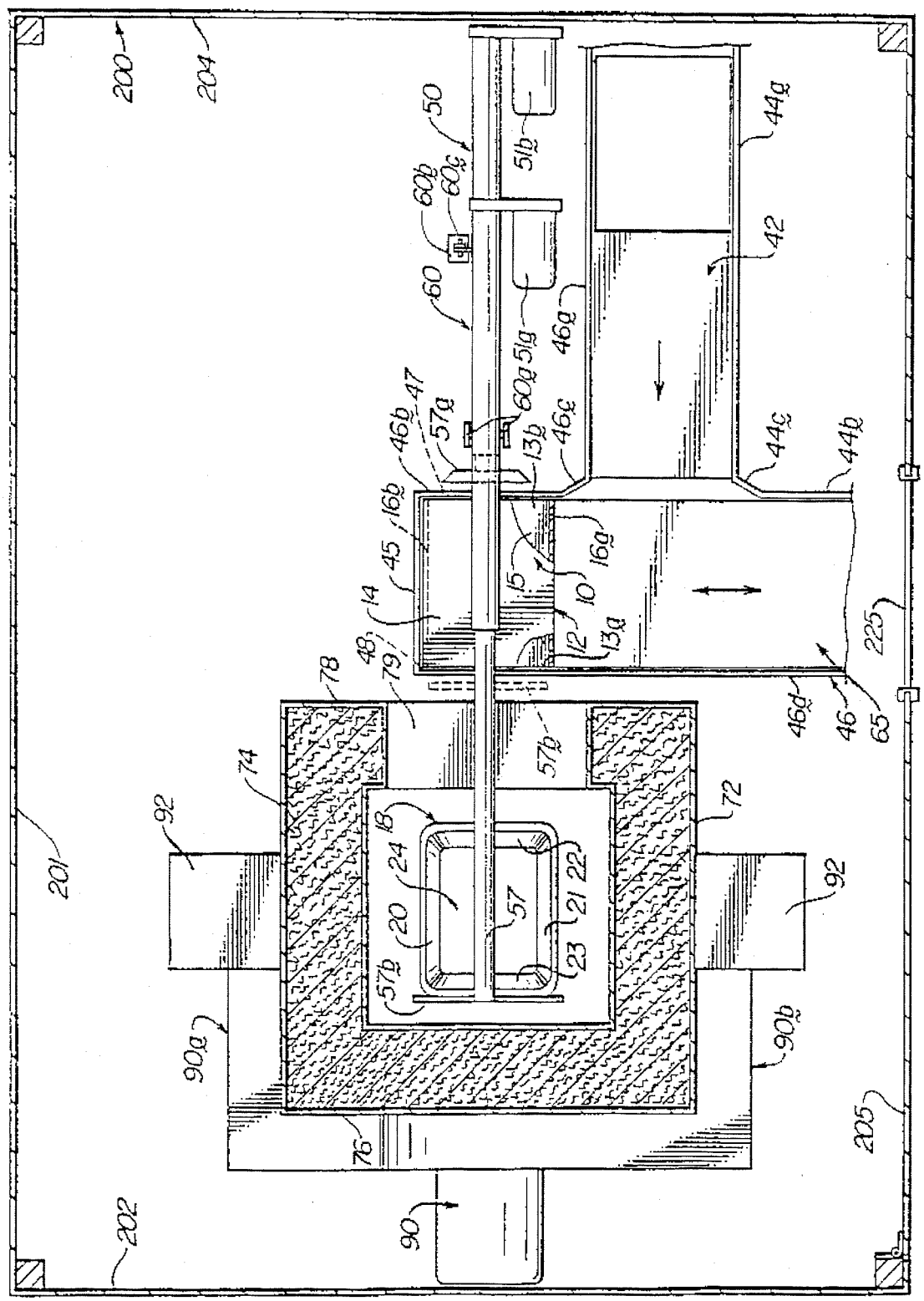
FIG. 5 is a cross-sectional view taken along line 5—5 of FIG. 1.
Figure 6:
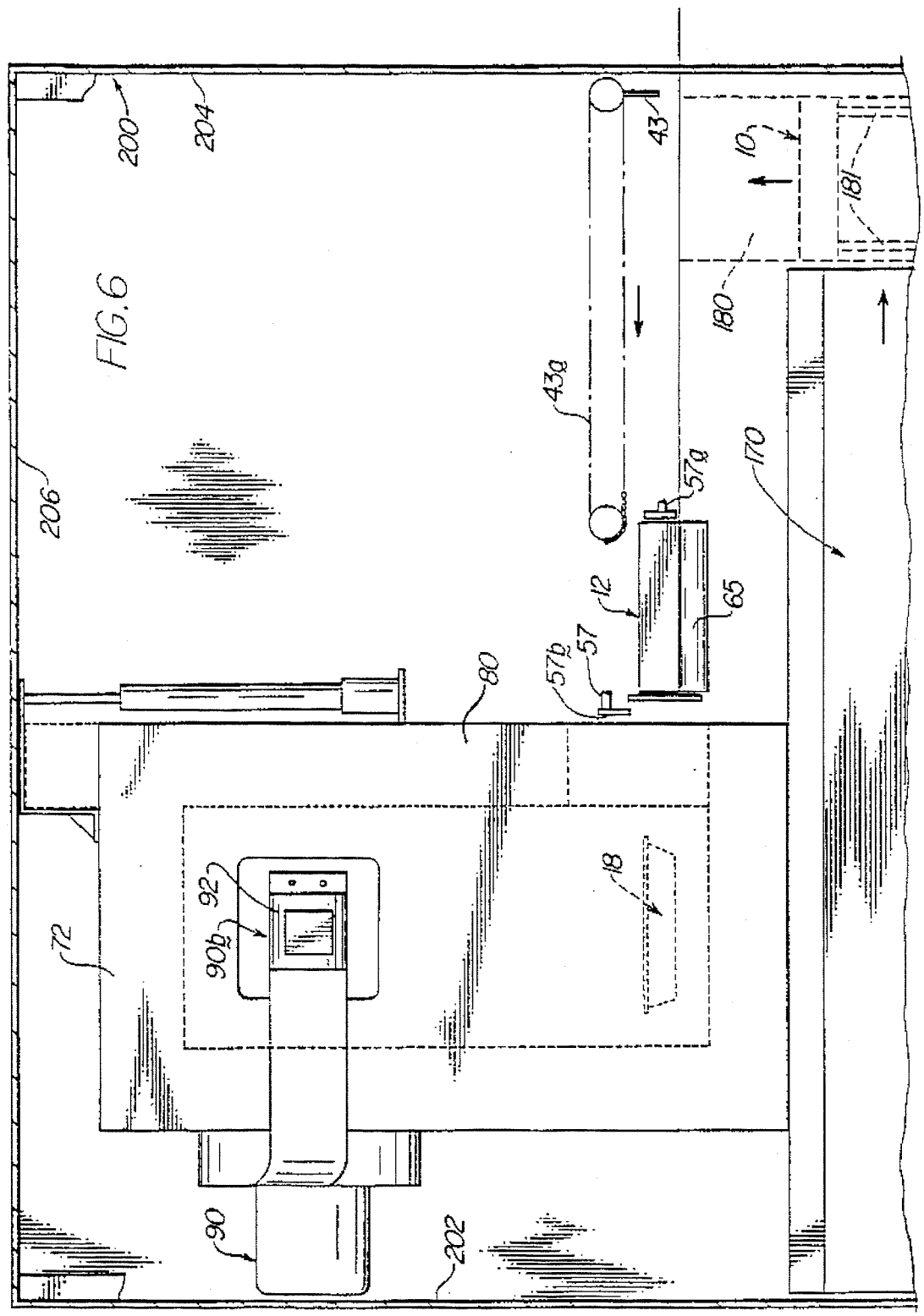
FIG. 6 is a cross-sectional view taken along line 6—6 of FIG. 1.

As diagrammatically illustrated in FIG. 5 of the drawing, electro-mechanical actuator 60 having rake plate 57b mounted thereon is pivotally mounted between a pair of lugs 60a and is rocked in a vertical plane by a solenoid 60b connected to an actuating arm 60c secured to cover tube 58 of actuator 60.

When rake plate 57b is in its retracted home position indicated in dashed outline at 57b in FIG. 5 of the drawing, rake plate 57b is preferably positioned at an elevation above container 18 such that when translating tube 57 is extended to the full outline position, the lower edge of rake plate 57b moves above the upper edge of container 18. When rake plate 57b reaches the full outline position illustrated in FIG. 5 of the drawing, solenoid 60b is actuated for moving rake plate 57b downwardly to an elevation below the lip extending around container 18 such that when translating tube 57 is retracted to the dashed outline position, container 18 will be returned through passage 48 in product guide member 46 and returned to the interior of tubular sleeve 12. After container 18 has been deposited in tubular sleeve 12, solenoid 60b will again be actuated for elevating rake plate 57b to a position above the upper edge of opening 48 such that pusher plate 57a may be actuated for moving the next container 18 into the oven.

Conveyor 65 includes a flexible belt 66 extending around a drive roller 66a and a driven roller 66b, drive roller 66a being driven by a reversible variable speed motor 68.

The in-feed conveyor, generally designated by the numeral 42, comprises a paddle 43 suspended between chains 43a and 43b which extend around drive sprockets mounted on a shaft driven by a motor 43d. The in-feed conveyor 42 is mounted between guide members 44 and 46. As illustrated in FIG. 5, guide member 44 comprises a generally L-shaped member formed by substantially perpendicularly disposed legs 44a and 44b connected by a transition section 44c. Product guide member 44 is connected to a second product guide member 46 by a front bracket 42f and a rear bracket 42r. As illustrated in FIG. 1 of the drawing, an in-feed drive motor 43d is secured to guide member 46 and paddle 43 is moved between guide members 44 and 46 by chains 43a and 43b.

Product guide member 46, best illustrated in FIG. 5, is formed by generally perpendicularly disposed legs 46a and 46b connected by a transition section 46c. A third leg 46d extends generally parallel to leg 46b and has an end secured to an end of leg 46b by stop member 45. As will be hereinafter more fully explained, stop member 45 functions as a stop to limit movement of package 10.

Leg 46b of product guide member 46 has a first passage 47 formed therein while section 44d has a second passage 48 formed therein. As will be hereinafter more fully explained, when conveyor 65 moves package 10 into engagement with backstop 45, the open end 13a of tubular sleeve 12 is positioned adjacent opening 47 while the open end 13b of sleeve 12 is positioned adjacent passage 48. When motor 51a of the linear actuator of loader assembly 50 is energized, tube 57 and push plate 57a on the end thereof will move through passage 47 and through the open end 13b of sleeve 12 for moving container 18 through the open end 13a of sleeve 12 and through passage 48 into a cooking chamber in oven 70. After container 18 is positioned in the cooking chamber, motor 51a is reversed, thereby retracting translating tube 57 and push plate 57a to the position illustrated in FIG. 1 of the drawing.

After the product 30 in container 18 has been heated, motor 51b of the linear actuator of the unloading assembly 60 will be energized to extend the translating tube 57 of the unloading assembly 60 causing the rake plate 57b to move into the cooking compartment above container 18 and then pivot downwardly for engaging lip 19 on end wall 23 on container 18. Motor 51b is then reversed for retracting tube 57 and rake plate 57b for urging container 18 out of the oven 70, through passage 48 and through the open end 13a of sleeve 12. When motor 68 is energized, the heated food product 30 in container 18 which has been repositioned in sleeve 12 will be moved toward the delivery end of conveyor 65.

Product guide members 44 and 46 are bolted or otherwise secured to the upper surface of loader base member 42a upon which in-feed conveyor 42 and delivery conveyor 65 are mounted.

The oven 70 comprises spaced side walls 72 and 74, a back wall 76 and a front wall 78. Front wall 78 has an access opening 79 formed therein which is opened or closed by a door 80. A microwave trap 81 is formed around door 80 and is configured to prevent passage of microwave energy through space between the periphery of the door 80 and walls of the cabinet 70. Top wall 71 and bottom wall 73 close-upper and lower ends of oven 70. Each wall of the oven is preferably formed by spaced metallic sheets and the space between the sheets is filled with thermal insulation material.

An actuator 82, secured to mounting bracket 82a, is connected through a link 84 to door 80 for moving door 80 vertically relative to access opening 79. Actuator 82 is preferably an electro-mechanical actuator of the type illustrated in FIG. 14 and is driven by a motor 51a.

Figure 2:
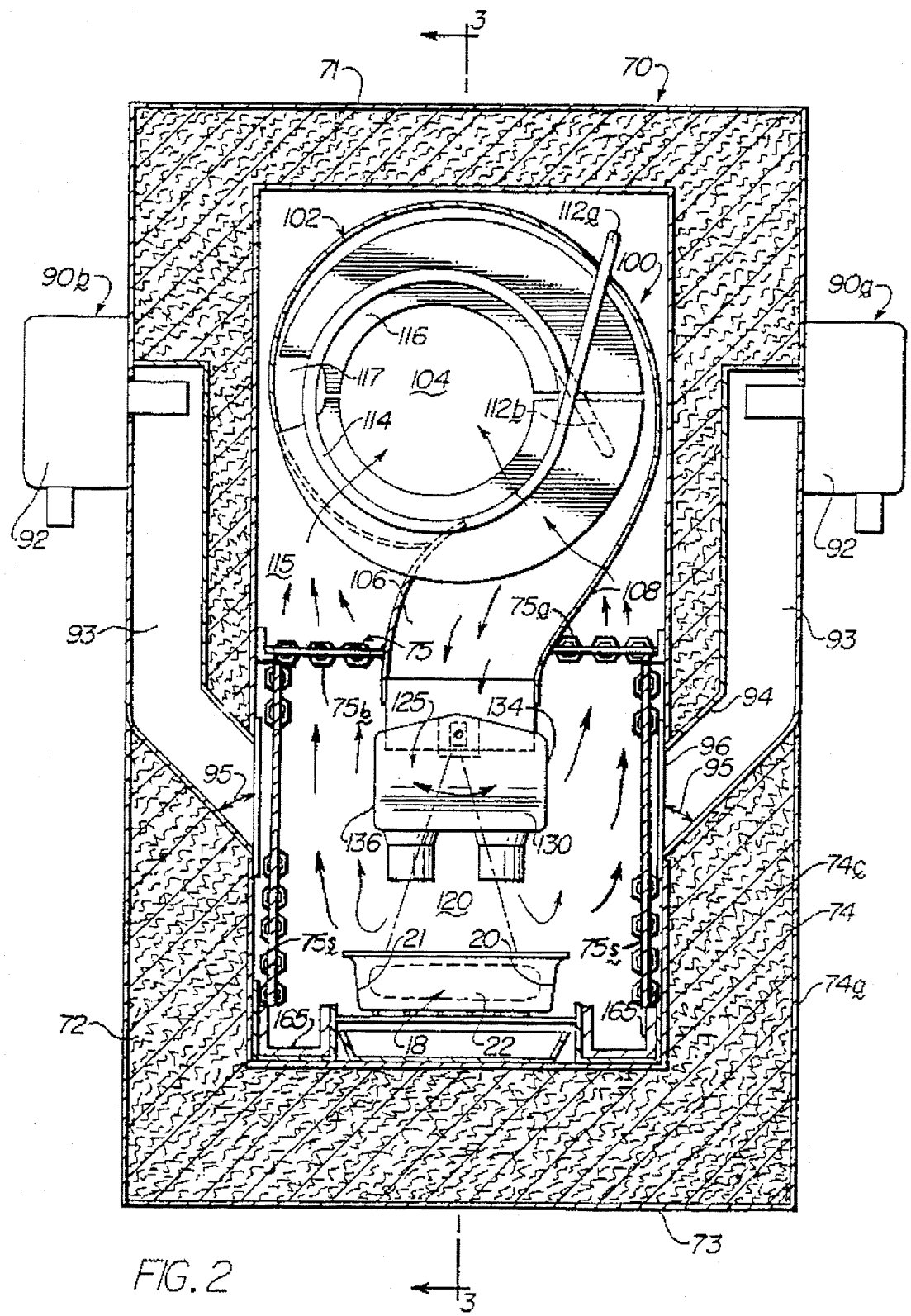
FIG. 2 is a cross-sectional view taken along line 2—2 of FIG. 1.

Referring to FIGS. 1 and 2 of the drawing, the electromagnetic radiation device generally designated by the numeral 90 in the illustrated embodiment comprise a pair of magnetrons 92 connected to wave guides 93 formed in side walls 72 and 74 of oven 70. The magnetrons 92 supply electromagnetic energy to wave guides which carry the energy to the cooking chamber. A preferred microwave frequency is 2450 megahertz. Magnetrons 92 are conventional vacuum tubes in the microwave oven that convert electrical energy to electro magnetic energy in the microwave frequency spectrum. Waves of microwave energy are similar to radio waves except they are higher frequency than radio waves and lower frequency than ordinary light waves. The microwave energy is channeled through wave guides 93 from the magnetrons 92 into the cooking chamber 120.

As illustrated in FIG. 2 of the drawing, the side walls 72 and 74 are formed by spaced sheets 74a and 74b and insulation material 74c is configured to form a guide tube 93 having a lower end 94 which is inclined at an angle 95 relative to a vertical plane 96 at an angle in a range between 15° and 75°. In the illustrated embodiment, the angle 95 is approximately 45°.

The application of microwave radiant heating is delivered from two sides and angles downwardly toward food 30 in an open top container 18. Since the container and the food in the container do not reflect microwaves significantly and since the space under the container diffuses microwave which passes through or by the container the beam from one wave guide is not reflected directly into the other but is largely retained in the heating chamber.

Since the container 18 is non-metallic, reflections from one wave guide 93 are not reflected into the other to keep microwave in the chamber 120 to effectively heat the food 30.

The support for the open package is preferably less than 25% reflective of the microwave.

The reflective surface of the bottom 24 of the container 18 is greater than one-fourth wave length, for 2450 megahertz (MHZ) microwave one-fourth of 13 cm, below the surface of food being heating. The angle and the distance reduce standing waves in the small heating cavity.

A tube 103 is connected through a valve 103a to a supply of water or steam and which may be used for delivering an atomized spray of water or steam into the air conditioning chamber 115 for controlling the relative humidity and dew point of air circulated through air conditioning chamber 115 and cooking chamber 120.

Figure 3:
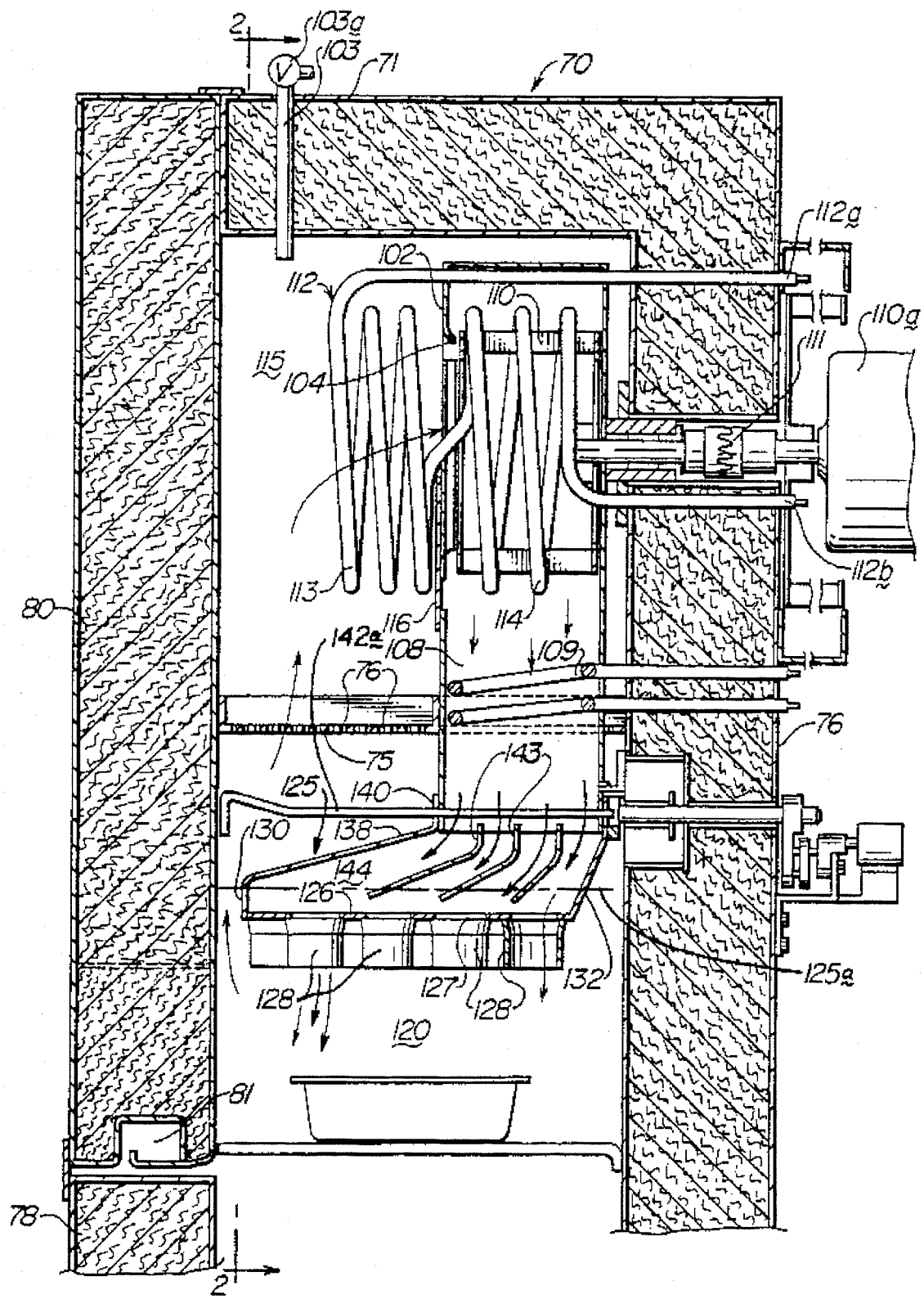
FIG. 3 is a cross-sectional view taken along line 3—3 of FIG. 2.
Figure 4:
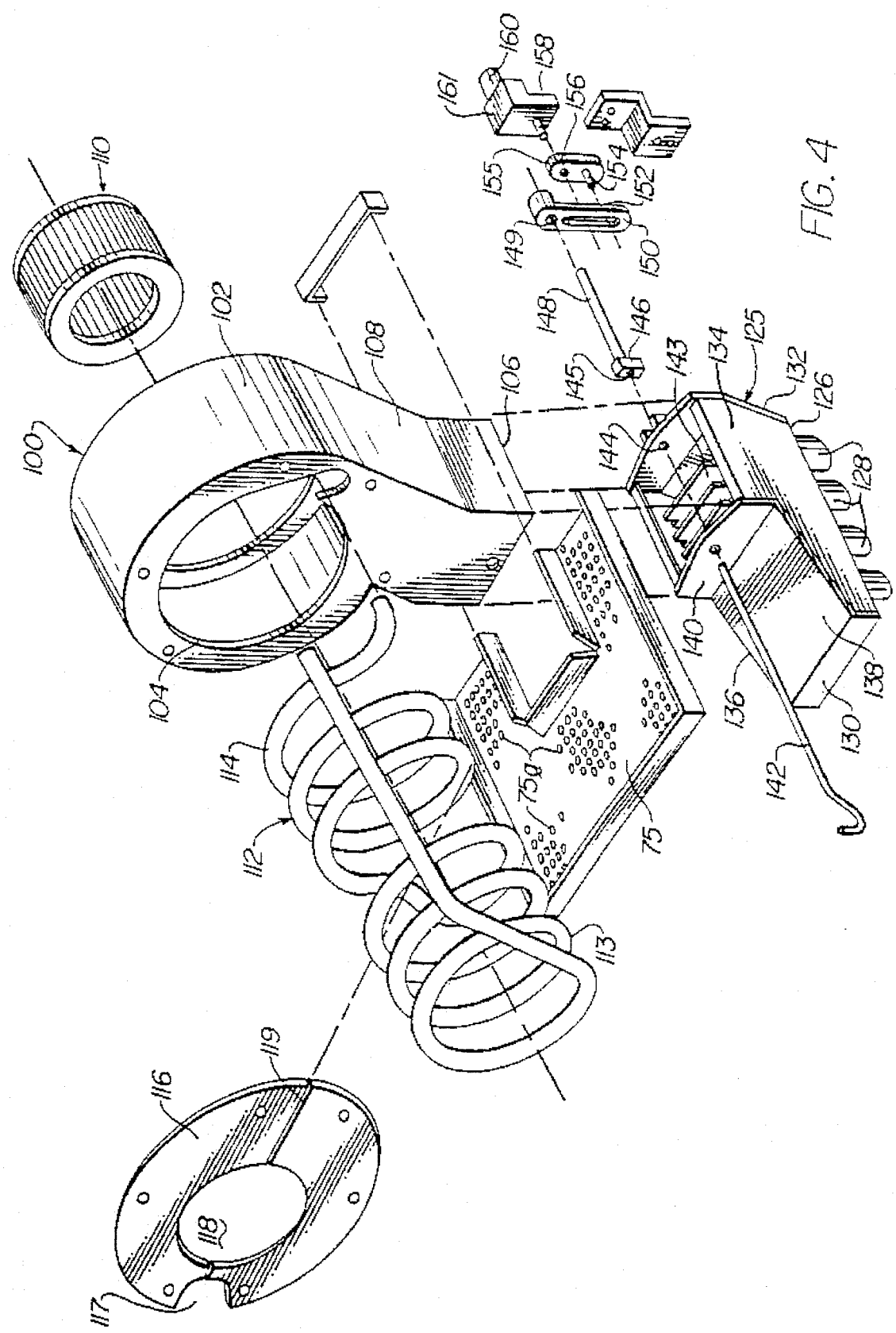
FIG. 4 is an exploded perspective view of the air dispensing apparatus.

Referring to FIGS. 2, 3 and 4 of the drawing, air circulating apparatus generally designated by the numeral 100 comprises a blower housing 102 having an inlet opening 104 and a discharge opening 106. As illustrated in FIGS. 2 and 4, blower housing 102 is in the form of a volute and a plenum section 108 is formed adjacent the discharge opening 106.

A radial flow fan impeller 110 draws air axially through inlet opening 104 and discharges air radially through plenum section 108 and discharge opening 106.

A heating element 112 having coils 113 of a first stage and coils 114 of a second stage is mounted for heating air drawn into the blower housing 102.

As best illustrated in FIG. 3 of the drawing, the interior of the oven cabinet 70 is divided by a perforated plate 75 to form an air conditioning chamber 115 and a cooking chamber 120. Perforated plate 75 is constructed of a metallic material and has perforations 76a with relatively small openings preferably equivalent to more than 50% of the surface area. The perforated metal plate 75 prevents microwave energy from passing into the air conditioning chamber 115.

Figure 29:
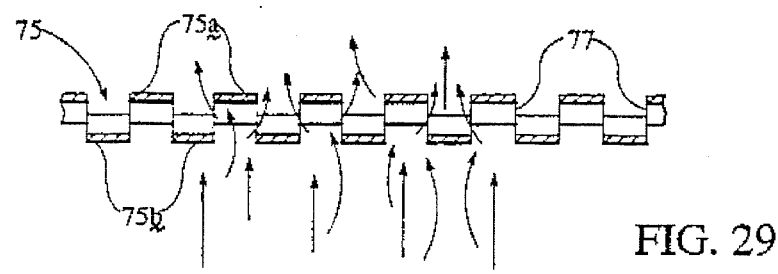
FIG. 29 is a cross-sectional view taken along line 29—29 of FIG. 27.
Figure 27:
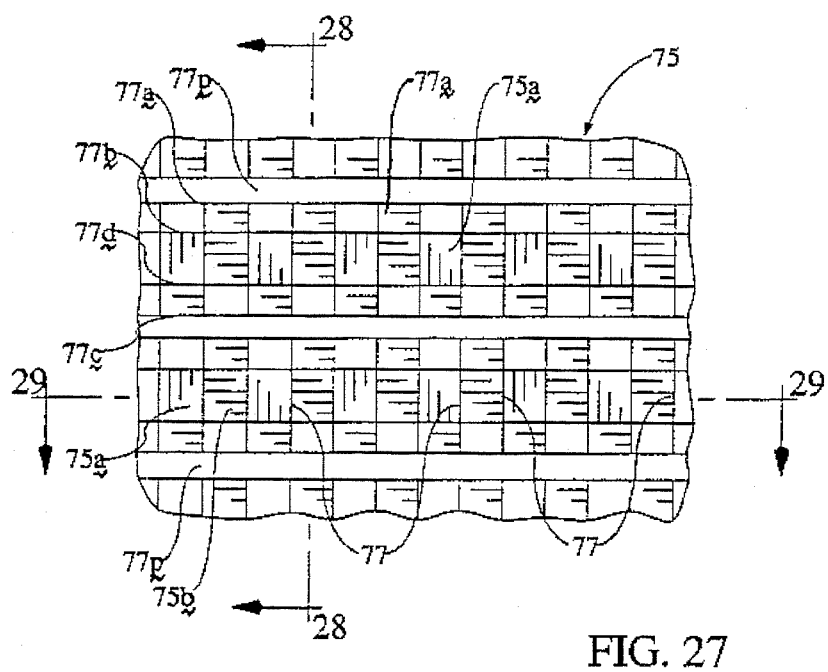
FIG. 27 is a fragmentary elevational view of a portion of the partition between the cooking chamber and the air conditioning chamber.
Figure 28:
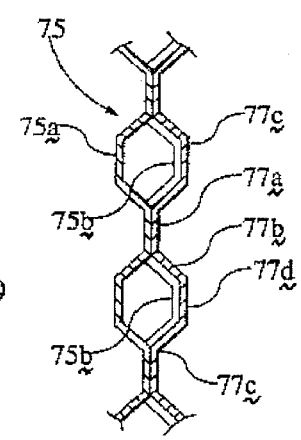
FIG. 28 is a cross-sectional view taken along line 28—28 of FIG. 27.

The perforated plate 75 forms a splatter shield on which airborne spoil accumulates. Referring to FIGS. 27, 28 and 29 of the drawing, perforated plate 75 is preferably a single sheet of metallic material having rows of slits 77 which extend longitudinally of the sheet. Central portions of the sheet are deflected along lines 77a, 77b, 77c and 77d, without removing material from the sheet to form air passages through the sheet. Between adjacent slits 77 sections of the central portions of the sheet are deflected upwardly to form upwardly extending ridges 75a, by bending the material along lines 77a, 77b, 77c and 77d. Other segments of the sheet are deflected to form downwardly extending ribs 75b by bending the material downwardly along fold lines 77a–77d.

When adjacent segments 75a and 75b of sheet 75 are deflected in opposite directions air passages 75c are formed in the sheet.

The perforated partition 75 constructed of metallic material and due to its geometric configuration forms a barrier which prevents passage of microwave energy into the air conditioning chamber 115. This significantly contributes to reducing the propagation of microwave energy through passages formed in the wall of the air conditioning compartment through which fan drive shafts, electrical conductors, steam injectors, and ventilation ducts are mounted.

Further, the perforated sheet 75 significantly aids in removing grease and other particulate material from the recirculating air and is preferably mounted for easy removal for cleaning.

In heavy duty food service ovens, cleaning is a major consideration.

Sheets of the same perforated material are preferably mounted to form removal splatter shields 75s adjacent opposite sides of the food product to form an oven liner which is easily removable for cleaning. Soil collector pans or trays 165 extend around the food product to catch any food particles which may be dislodged from the cooking container during the cooking process.

A coating or layer 75d of non-conductive insulator material is applied to at least one surface of the perforated sheet 75. If it is deemed expedient to do so, only top surfaces of deflected portions 75a between fold lines 77b and 77d may be coated with insulator material to prevent microwave arcing between surfaces of perforated sheet 75 and a metallic pan surface.

Microwave energy at a frequency of 2,450 megahertz tends to arc when two metal surfaces approach each other at a low angle. The arcing not only wastes heating energy, it can cause fires in dry products and can pit the metal surfaces.

Heretofore, applying porcelain coatings to flat metallic sheets to prevent arcing has resulted in the porcelain coating tending to chip and crack when the flat sheet of metal is deflected. However, the perforated sheet 75 having portions 75a and 75b deflected outwardly in opposite directions from a central planar portion 75p is relatively stiff which significantly reduces the tendency of the ceramic coating 75d to crack or chip.

As best illustrated in FIG. 3 of the drawing, the first stage of coils 113 is mounted in air conditioning chamber 115 outside of the blower housing 102 while the second stage of coils 114 is mounted inside blower housing 102. Terminals 112a and 112b of heating element 112 are connectable to a suitable source of electricity.

As illustrated in FIG. 4 of the drawing, a mounting plate 116 having a notch 117 formed in the periphery thereof and a central opening 118 is bolted or otherwise secured to blower housing 102 for supporting heating element 112. Plate 116 is formed in two parts which are connectable along a part line 119.

As illustrated in FIG. 3, blower 110 is mounted on a shaft which is driven through a coupling 111 by a motor 110a.

Coils of a third stage heating element 109 are mounted in the plenum section 108 of blower housing 102 and positioned such that air delivered radially from blower 110 is heated immediately prior to being delivered through discharge opening 106. It should be readily apparent that only coils 109 may be activated while coils 113 and 114 are idle, if it is deemed expedient to do so depending upon the heating requirements of a particular food product.

An air dispensing duct generally designated by the numeral 125 is secured to plenum 108 for receiving air from discharge opening 106.

As best illustrated in FIGS. 3 and 4 of the drawing, air dispensing apparatus 125 comprises a tapered duct formed by a perforated plate 126 having an array of passages formed therein which communicate with tubes 128. A front wall 130 and a rear wall 132 extend upwardly from the perforated plate 126 and are connected between side walls 134 and 136. An inclined top wall 138 extends between front wall 130 and a flange 140 encircling the lower end of plenum 108 and enclosing the discharge opening 106 from the blower housing 102.

As illustrated in FIG. 3 of the drawing, air directing vanes 143 extend between side walls 134 and 136 of the tapered duct 125 for distributing air along the length of the interior 144a of the tapered duct 125. Air directing vanes 143 are configured to deliver temperature controlled air into the duct substantially parallel to a longitudinal axis 125a of duct. Streams 128a and 128b of air are directed transversally of the axis 125a from said duct toward the food product 30. As the duct reciprocates about the axis 142a of pin 142, which is parallel to the axis 125a of the duct, streams 128a and 128b of air impinge on discrete areas on the surface of the food product 30 to transfer heat between the air streams and the surface of the food product 30.

The air dispensing apparatus 125 is pivotally secured to duct plenum 108 by a pivot pin 142 extending through aligned apertures 144 in flange 140. Pivot pin 142 extends into an opening 145 formed in lug 146 on shaft 148 which extends into an aperture 149 on a link 150. Link 150 has an elongated slot 152 formed therein into which a pin 154 on crank 155 extends.

Crank arm 155 has an aperture which receives a drive shaft 158 driven by motor 160 through a gear reducer 161.

A radial blower 110 discharges its highest velocity air from the outer portion of the volute downwardly through shaped openings in tubes 128 to impinge upon a narrow food product 30 in the open top container 18.

Figure 11:
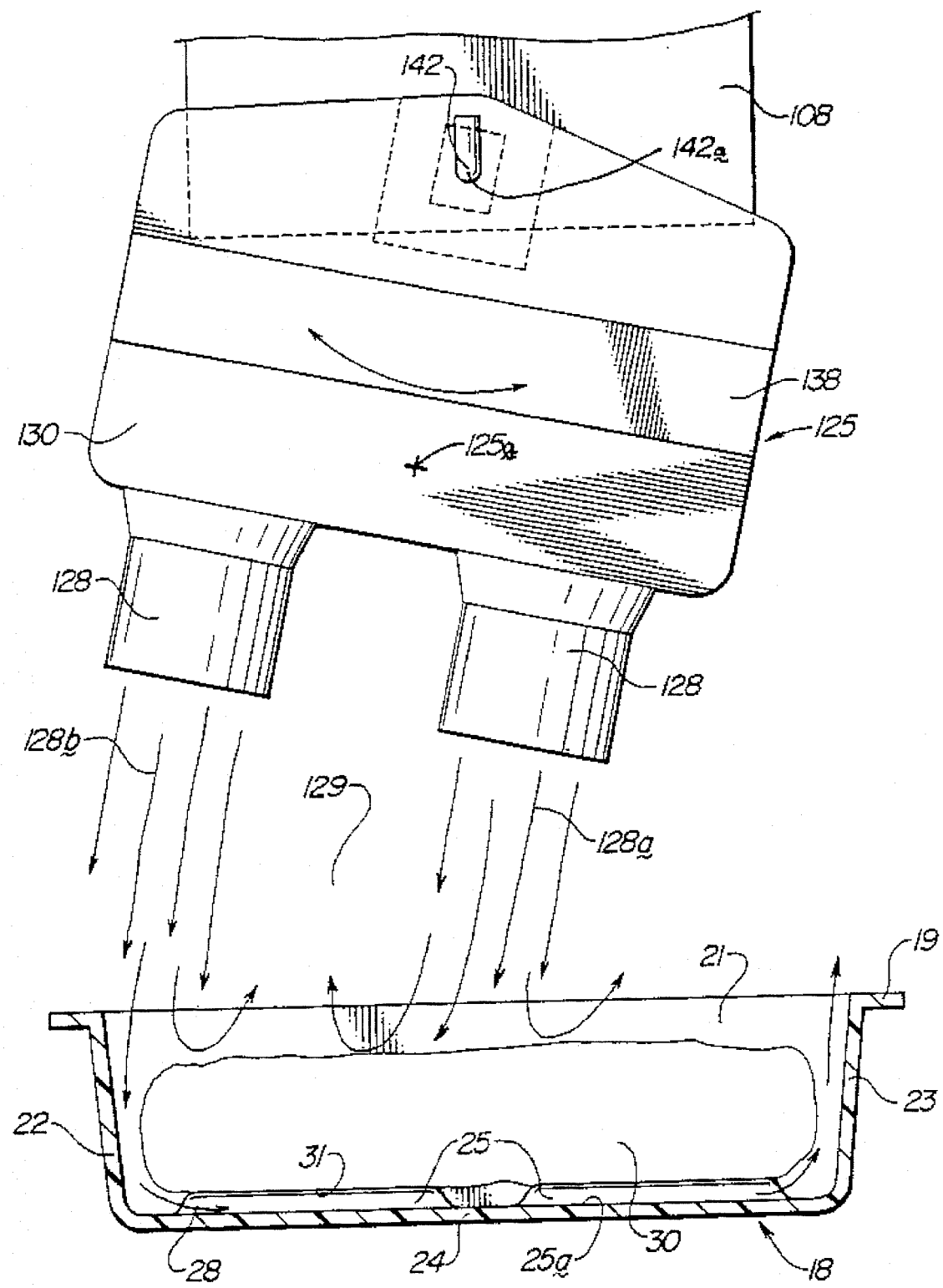
FIG. 11 is a diagrammatic view illustrating air flow during a first stage of the cooking process.
Figure 12:
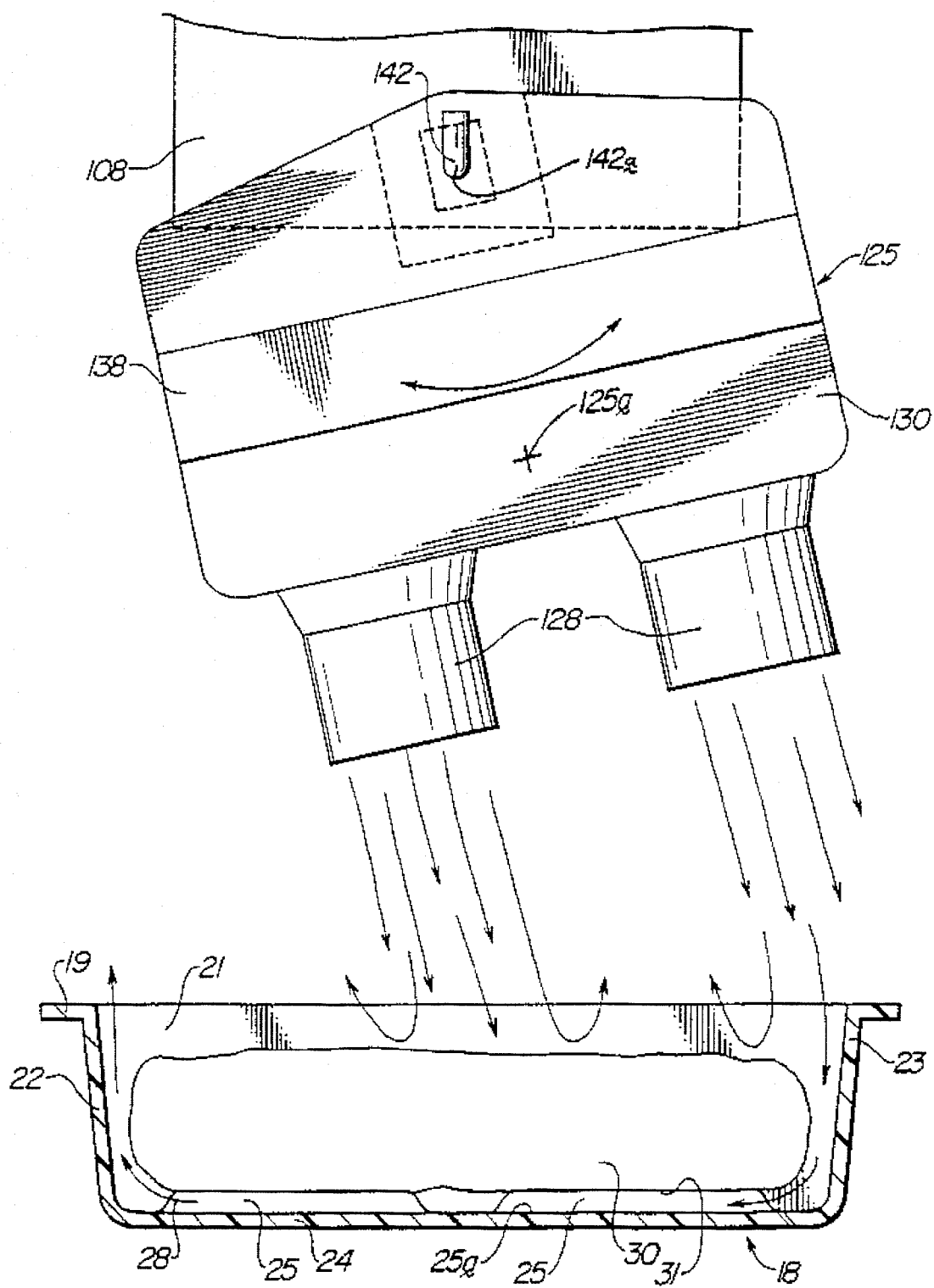
FIG. 12 is a diagrammatic view similar to FIG. 11 illustrating air flow during a second stage of the cooking process.

The air dispensing duct 125 is moved relative to the product 30 to give uniform coverage by the air streams. As best illustrated in FIGS. 11 and 12, the end walls 22 and 23 of the container 18 cause a portion of the air stream to be deflected to heat the sides and bottom 31 of product 30 in the container. The movement applies the air streams near one side of the container adjacent end wall 22 and then to the other side adjacent end wall 23 so that parts of the air streams are alternately applied to opposite exposed sides of the product 30 and are caused to alternate the lateral flow through loose stacks of food products 30 such as curled or random lengths of french fried potatoes. This alternating lateral air flow through paths 28 between support ribs 25 passes under and heats the lower side 31 of irregularly shaped products such as bone-in chicken parts.

The effectiveness of the sideways air heating of lower surfaces 31 can be enhanced by ribs 25 to provide air passages under flat products.

Further, the moving air dispensing apparatus 125 provides moving reflective-surfaces which serve as stirrers to help distribute the microwave energy in the cooking chamber 120.

The combination of extended orifices through tubes 128, and the open top container 18 provides air escape path 129 while bringing the orifice to an optimum distance from the product 30. It should be noted that upper edges of the sides 20 and 21 and ends 22 and 23 of container 18 extend above the height of the contained product 30 to enhance air flow between the lower surface 31 of the product 30 and the bottom 24 of container 18.

As illustrated in FIG. 2 of the drawing, streams of air dispensed from air dispensing duct 125 through hollow air dispensing tubes 128 impinge upon the upper surface of a food product 30 in container 18. The spent air travels through space 129 between tubes 128, as illustrated in FIGS. 11 and 12 of the drawing. Spent air travels upwardly adjacent baffles 75s and the recirculating air is drawn upwardly through passages 75c formed in the perforated plate 75.

Soil collector pans 165 are preferably removably mounted and are maintained at a temperature which is less than the temperature of any other surface in the oven 70 for causing very fine smoke-type particles in the moving air to be collected on the coldest surface in the recirculating path. To assure that the soil collection pans 165 are maintained cooler than other surfaces in oven 70, the pans may be exposed to outside air or water cooling to facilitate collecting aerosol from the recirculating air.

From the foregoing it should be readily apparent that the disclosed method for controlling the temperature and surface texture of a food product which is to be delivered from vending machine 200 generally comprises delivery of a suitably packaged and preserved food product from a storage compartment 170 to an oven 70. The package 10 is positioned by back stop member 45 in a predetermined relationship relative to electro-mechanical linear actuators 50 and 60 and relative to access opening 79 communicating with cooking chamber 120 in oven 70.

Actuation of the actuator of the loading device 50 results in movement of push plate 57a through tubular sleeve 12 for pushing container 18b out of sleeve 12 and into the cooking chamber 120. Streams 128a of air delivered through tubes 128 of the air circulating apparatus 100 melts and shrinks film 27a for uncovering food product 30 in the open top container 18b.

In the embodiment illustrated in FIG. 15 of the drawing, one or more air streams 128a, after causing the food product 30a in container 18 to be uncovered will be delivered through the open top of container 18b. If the food product 30a in the container is strips or slices of pasta, potatoes or other particulate material, air from stream 128a will be delivered through the stacked material in heat transfer relation with the surface of the pieces of the food product.

If food product 30 is a solid article as designated by the numeral 30 in FIGS. 11 and 12 of the drawing, air dispensing duct 125 is preferably rocked causing air streams 128a and 128b to move across the surface of the food product between lateral edges thereof such that regions of controlled air pressure are alternately formed adjacent opposite sides of the product 30 such that temperature controlled air flows through passage 28 between the lower surface 31 of the food product and the upper surface 25a of the bottom 24 of container 18.

After the surface of the food product 30 has been heated by air streams 128a and 128b, the recirculating air tends to limit localized heating of the product by microwave energy delivered by magnetrons 92. Tips, and thin areas of the product which are rapidly heated by the microwave energy may actually dissipate heat to air in streams 128a and 128b to provide cooling to certain portions of the food product.

After the food product 30 in container 18 has been sufficiently heated, air flow through the air circulating apparatus 100 is terminated, magnetrons 92 are turned off and blower actuator 82 is energized for moving the door upwardly to the position illustrated in FIG. 1 of the drawing. The electro-mechanical actuator of the container unloading device 60 is then actuated for moving rake plate 57b from the-dashed outline position in FIG. 5 of the drawing to the full outline position. Rake plate 57b is then lowered and retracted for moving container 18 out of the oven and redepositing the hot container and the food therein in the tubular sleeve 12.

After the heated food product and container 18 have been moved into the protective tubular sleeve 12, conveyor 65 is energized for moving the heated food product toward the delivery passage 224 of the vending machine 200 such that the product is accessible to the customer by opening protective door 225.

SECOND EMBODIMENT

A second embodiment of the oven is illustrated in FIGS. 22–30 of the drawings.

The second embodiment of the oven, generally designated by the numeral 270, in FIGS. 22–25 of the drawing, comprises spaced side walls 272 and 274, a back wall 276 and a front wall 278. The front wall 278 has an access opening 279 formed therein which is opened and closed by a door 280. A top wall 271 and a bottom wall 273 close upper and lower ends of the oven 270. A microwave trap 281 is formed around door 280 and is configured to prevent passage of microwave energy through space around the door.

Magnetrons 292a and 292b are connected to wave guides 293a and 293b which extend horizontally across an upper portion of the oven. Microwave energy is delivered into an interior compartment in oven 270 through openings 296a and 296b.

Figure 22:
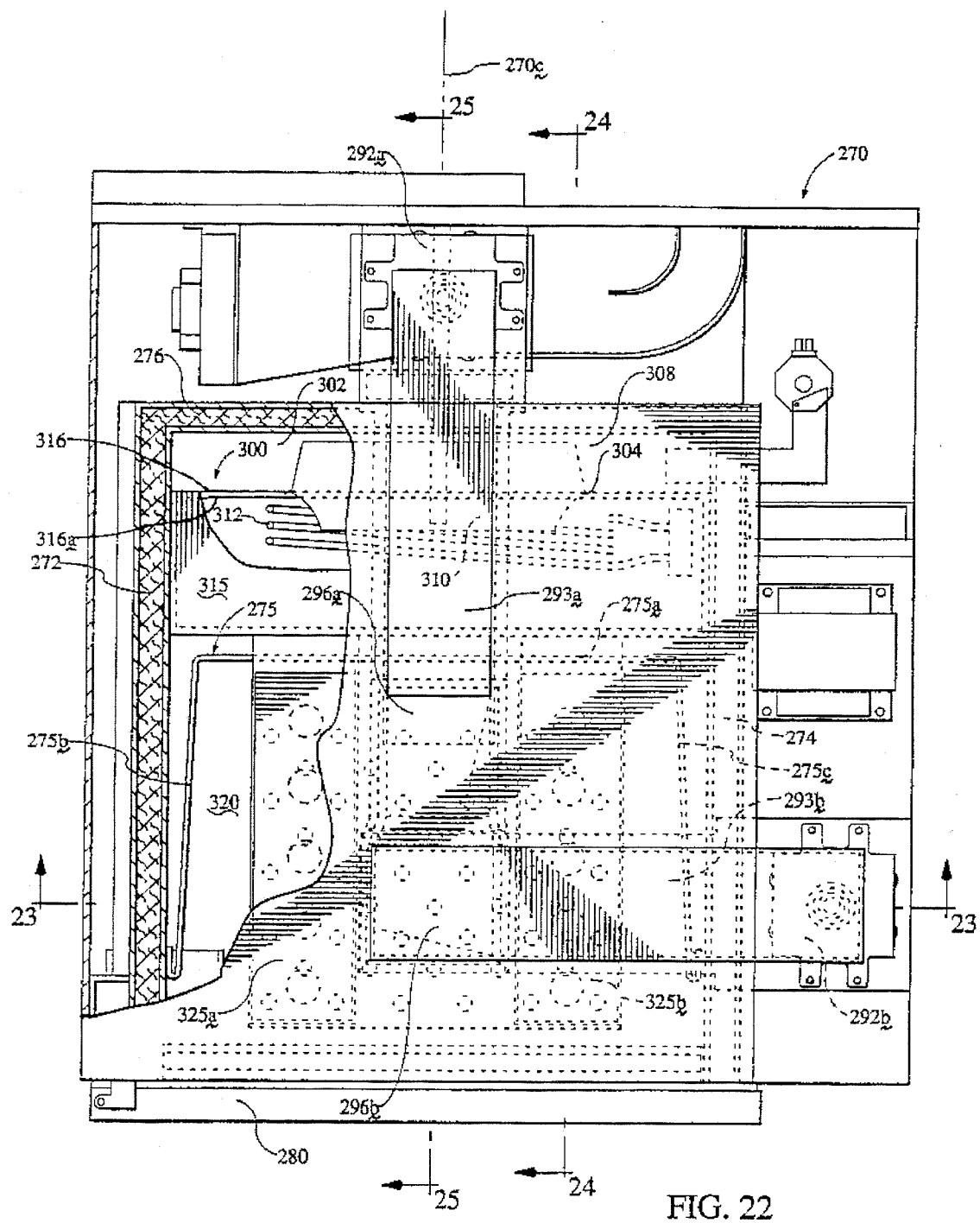
FIG. 22 is a top plan view of a second embodiment of the oven, parts being broken away to more clearly illustrate details of construction.
Figure 25:
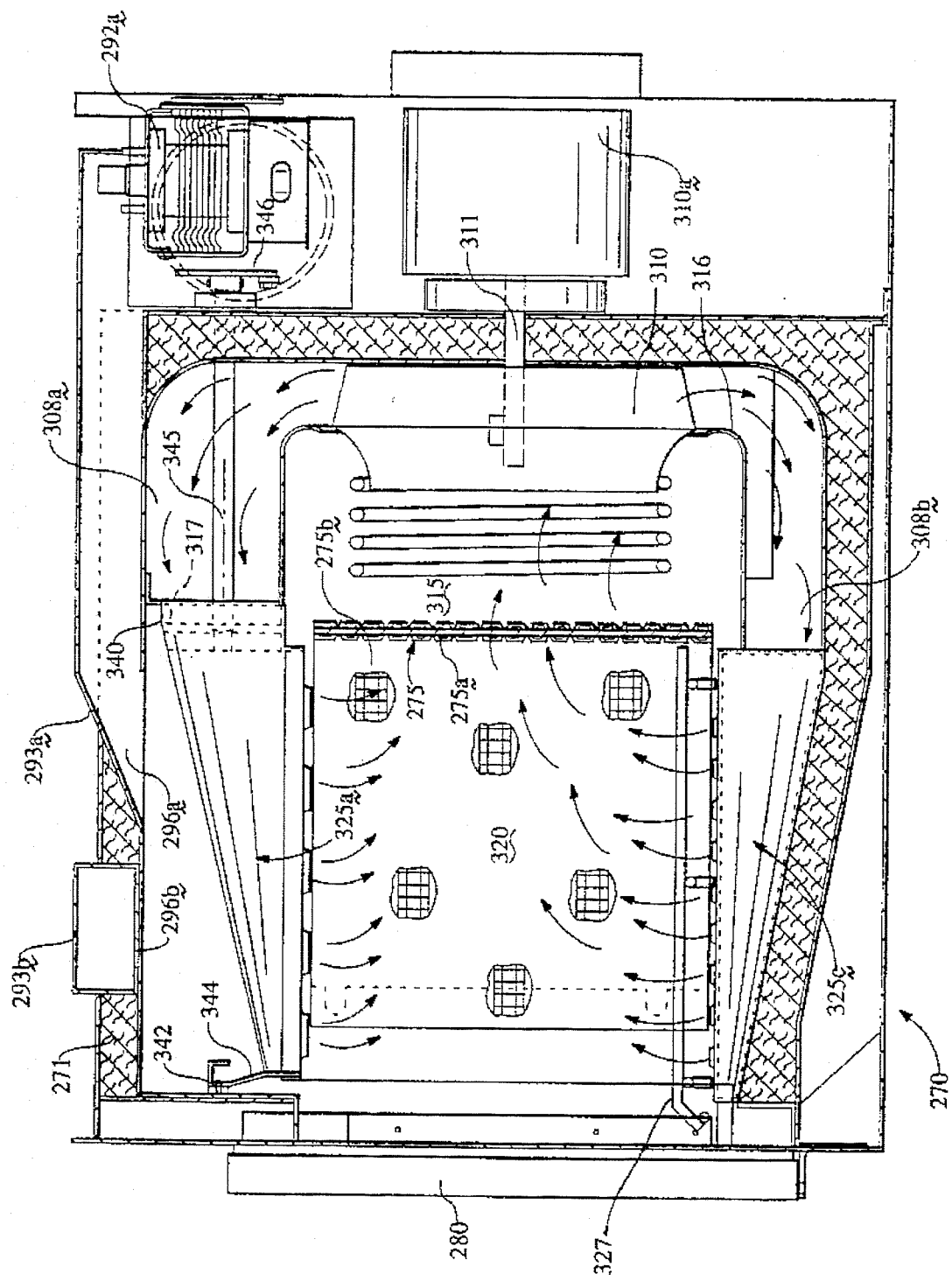
FIG. 25 is a cross-sectional view taken along line 25—25 of FIG. 22.

As best illustrated in FIGS. 22 and 25, opening 296b is formed in top wall 271 adjacent the door 280 and is positioned substantially equal distances between side walls 272 and 274. Opening 296a extends through top wall 271 rearwardly of opening 296b and wave guides 293a and 293b are positioned perpendicular to each other.

As best illustrated in FIGS. 22 and 25 of the drawing, wave guide 293a extends longitudinally of the oven, magnetron 292a being mounted adjacent the rear wall 276 of the oven. Electromagnetic energy is delivered from magnetron 292a through wave guide 293a extending longitudinally of the centerline 270c of the oven 270 into the oven through an opening 296a.

The second magnetron 292b is mounted adjacent a side wall 274 of the oven and delivers microwave energy through a horizontally disposed wave guide 293b, extending perpendicular to the centerline 270c of the oven, and through outlet 296b into the cooking chamber 320.

Microwave energy traveling through a wave guide into a microwave cooking cavity tends to form hot spots which are 2.4 inches apart directly below the opening into the cooking chamber, the hot spots being aligned with the length of the wave guide. Providing two wave guides 293a and 293b which extend perpendicular to each other results in the formation of four hot spots positioned adjacent four corners of a square.

Figure 23:
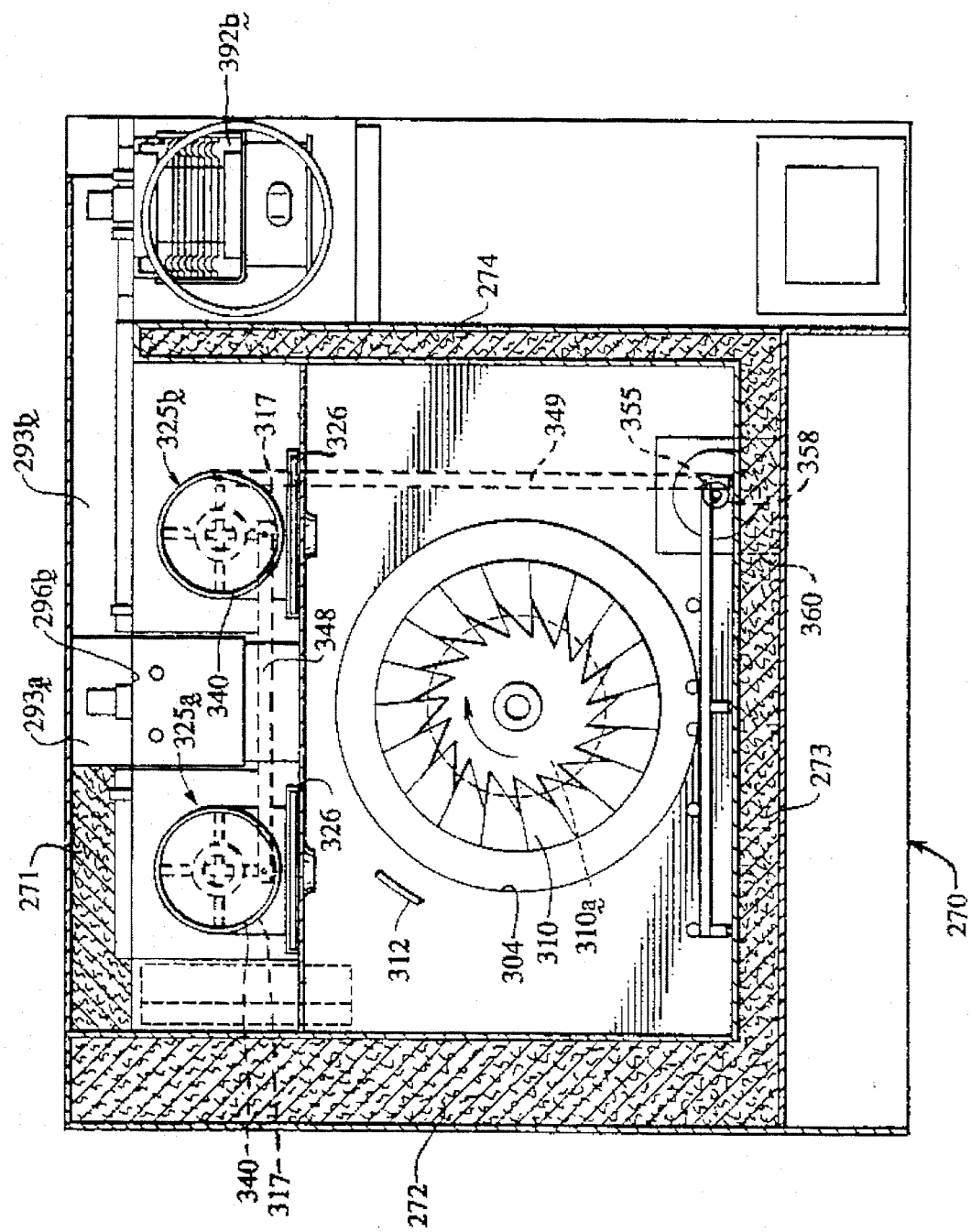
FIG. 23 is a cross-sectional view taken along line 23—23 of FIG. 22.
Figure 24:
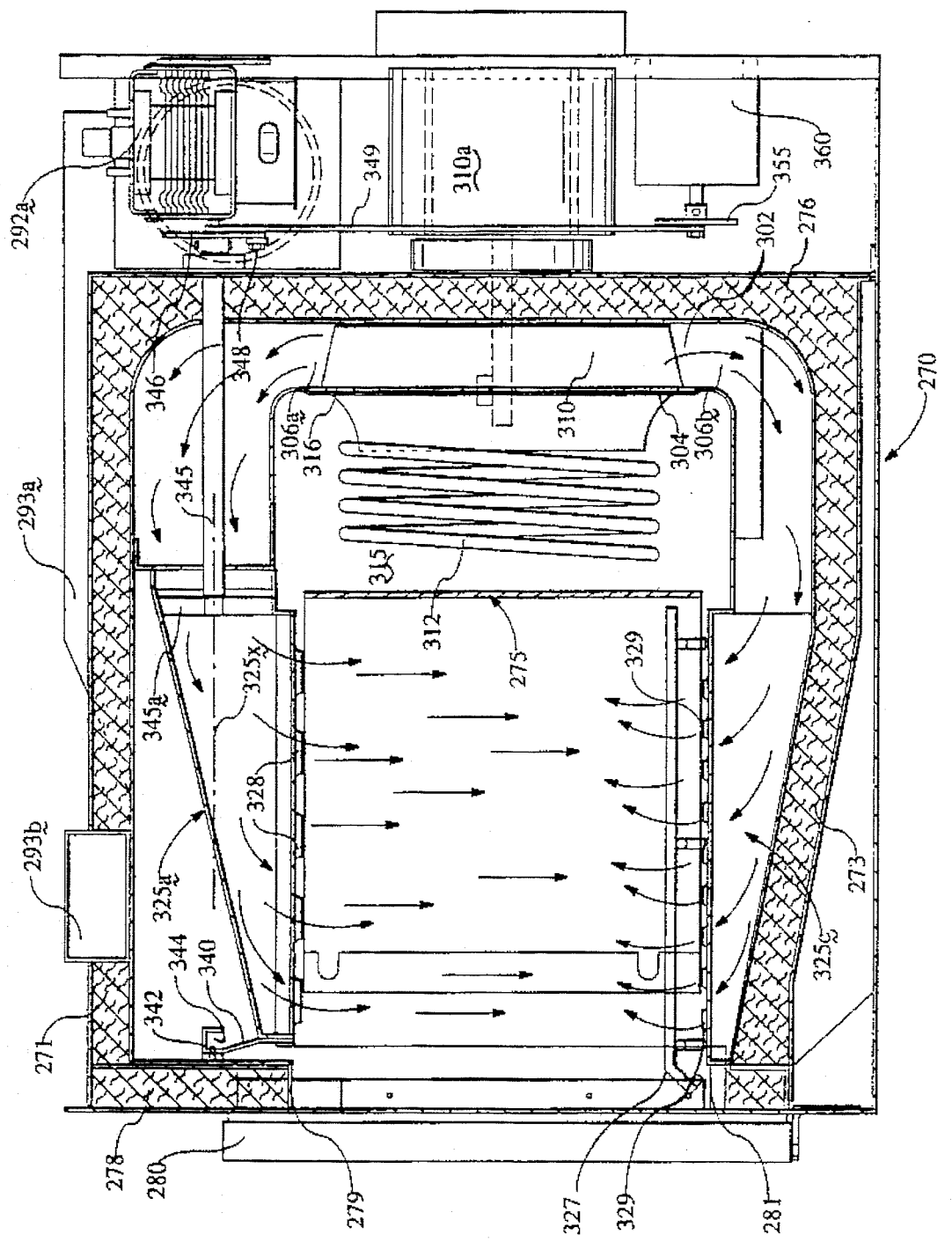
FIG. 24 is a cross-sectional view taken along line 24—24 of FIG. 22.

Referring to FIGS. 22, 23 and 24 of the drawing, air circulating apparatus generally designated by the numeral 300 comprises a blower housing 302 having upper and lower discharge openings 306a and 306b which extend horizontally above and below a radial flow fan impeller 310. A heating element 312 is mounted adjacent the inlet 304 into the fan housing.

As best illustrated in FIG. 25, the interior of the cabinet 270 is divided by a foraminous splatter shield 275 to form an air conditioning chamber 315 and a cooking cheer 320. The partition 275 is preferably the same material as the partition 75 hereinbefore described in the description of the first embodiment and illustrated in FIGS. 27, 28 and 29 of the drawing. In the illustrated embodiment of the invention, the air conditioning chamber 315 is spaced horizontally from the cooking chamber 320 so that the air conditioning chamber 315 is in the back of the oven and the cooking chamber 320 is in a front portion of the oven.

As best illustrated in FIG. 22, the foraminous partition 275 has a central portion 275a and extremities 275b and 275c configured to encircle a portion of the cooking chamber 320 such that the air conditioning chamber 315 extends around a major part of the periphery of the cooking chamber 315. Air is drawn along multiple paths toward side walls 272 and 274 and toward rear wall 276 from cooking chamber 320.

An upper plenum 308a and a lower plenum 308b are formed by a plenum wall 316 extending generally parallel to back wall 276. Plenum wall 316 has a generally vertically extending central portion 316a and generally horizontally extending upper and lower portions 316b and 316c, respectively. The central portion 316a has an opening 304 in which radial flow fan 310 is mounted.

A pair of circular tubular members 317 extend outwardly from spaced openings in the upper portion of the plenum wall and telescopically extend into circular sleeves 340 formed on air dispensing ducts 325a and 325b which oscillate about spaced axes 325x and 325y, as will be hereinafter more fully explained.

Figure 26:
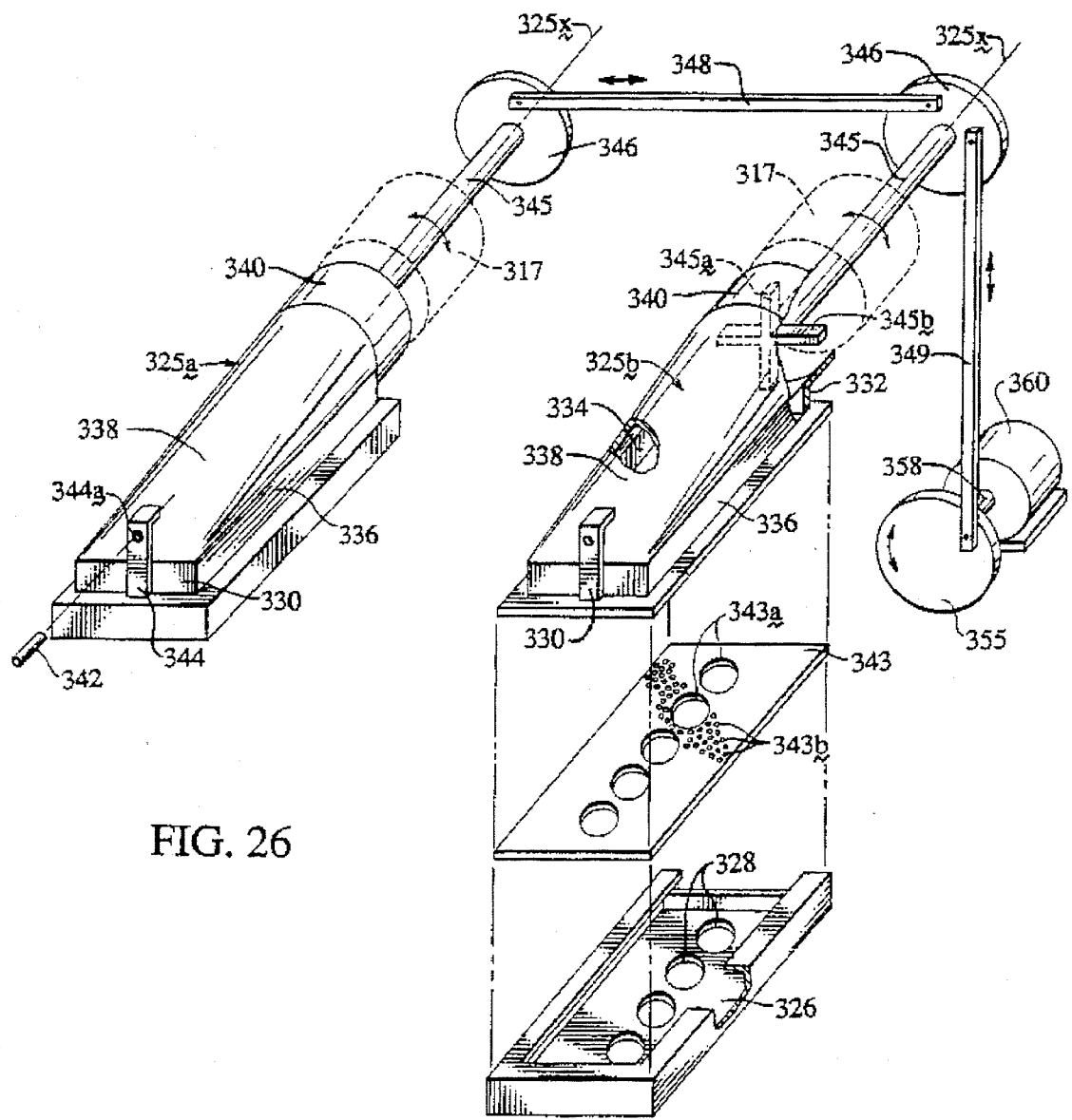
FIG. 26 is a fragmentary perspective view of a pair of oscillating air dispensing ducts.
Figure 30:
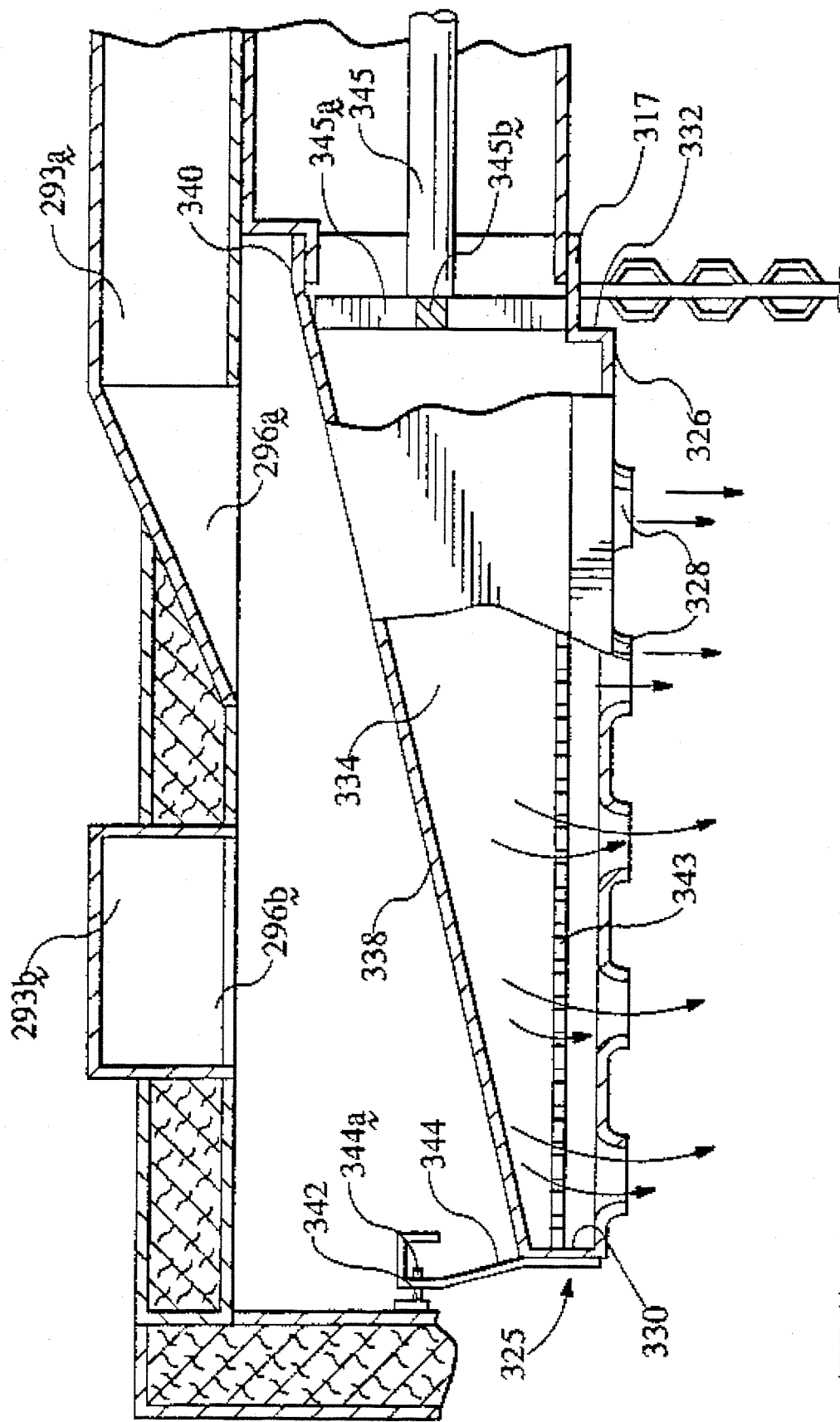
FIG. 30 is an enlarged cross-sectional view through an oscillating air dispenser.

Referring to FIGS. 26 and 30, each pair dispensing duct 325a and 325b comprises a body portion having a tapered cross section formed between space side walls 334 and 336 having outward extending flanges formed thereon.

A sheet of perforated material 343 having large and small apertures 343a and 343b formed therein is supported inside of each tapered duct 325a and 325b. A jet plate 326 having a plurality of spaced apertures 328 formed therein has inwardly projecting guide surfaces formed on upper ends of side walls such that the jet plate 326 is suspended from the flange extending along lower edges of side walls of the tapered ducts. The jet plate 326 is slidable longitudinally of the tapered duct so that it can be easily removed for cleaning.

The perforated plate 343 mounted inside the tapered duct has openings to form a slight back pressure in each tapered duct to maintain air pressure substantially uniform longitudinally of the duct. The combination of the tapered cross section of the duct and the perforated plate 343 contribute to provide a uniform air flow through each of the orifices 328 formed in the jet plate 326.

Further, openings 343a and 343b in the perforated plate 343 are configured to prevent passage of microwave energy from the cooking compartment 320 into the air dispensing ducts 325a and 325b.

As best illustrated in FIGS. 23 and 24 of the drawing, air dispensing ducts 325a and 325b comprise tapered ducts similar to the duct 125 described in connection with the first embodiment.

As best illustrated in FIG. 26 of the drawing, each air dispensing duct 325 comprises a tapered duct formed by a perforated plate 326 having an array of passages 328 formed therein. A front end wall 330 and a rear end wall 332 extend upwardly from the perforated plate 326 and are connected between side walls 334 and 336. The inclined top wall 338 extends between front wall 330 and a flange or sleeve 340 encircling tubular member 317 which forms an outlet from plenum 308.

The air dispensing apparatus 325a and 325b is pivotally secured to tubular member 317 by a pivot pin 342 extending through an aperture 344a in hanger 344.

A shaft 345 is welded or otherwise secured to cross members 345a an 345b which extend diametrically across tubular sleeve 340.

As best illustrated in FIG. 26 of the drawing, a disk 346 is mounted on the outer end of each shaft 345 and a connector link 348 is pivotally secured between disks 346 on shafts 345 of each air dispensing duct 325a and 325b.

One of the disks 346 is connected through a link 349 to a disk 355 mounted on the end of a drive shaft 358 from a gear drive driven by a motor 360.

From the foregoing it should be readily apparent that motor 360 rotates disk 355 which imparts reciprocating motion through link 349 to disks 346 mounted on shafts 345. As link 349 reciprocates the oscillatory motion of one disk 346 is transferred to the second disk 346 such that air dispensing ducts 325a and 325b reciprocate in unison relative to the food product 30 to provide uniform coverage by the air streams.

A lower tapered duct 325c, best illustrated in FIG. 24, which is significantly wider than the upper oscillating air dispensing ducts 325a and 325b delivers air streams upwardly to impinge against the bottom of a pan or a product supported on a rack 327 in the bottom of the oven.

From the foregoing it should be readily apparent that the apparatus hereinbefore described for transferring heat between temperature controlled air and a food product has multiple air dispensers 325a and 325b. Oscillation of multiple ducts 325a and 325b provides a more uniform sweeping action of air streams which project into the cooking chamber than could be accomplished with a single jet plate having apertures spaced across the entire length of the cooking chamber. The multiple air dispensers remain a substantially uniform distance from a food product in the cooking chamber as the air streams are moved across the surface of the food product.

The foraminous partition 275 having a configuration approximating that of the cooking chamber forms foraminous walls 275a, 275b and 275c around the food product for collecting any material which may splatter during the cooking process. Further, the foraminous walls 275a, 275b and 275c spaced from side walls 272 and 274 and rear wall 276 form a generally U-shaped air conditioning chamber 315 around the cooking chamber 320. Spent air flowing from the cooking chamber is drawn through openings in the foraminous side partition walls 275b and 275c and also through the central rear foraminous partition wall 275a. Thus, it should be readily apparent that air dispensed into the cooking chamber through the oscillating upper air dispensing ducts will be drawn away from opposite sides of the row of openings 328 formed in each air dispensing duct 325a and 325b. This minimizes the possibility that spent air will be drawn along a path which will wash out air streams dispensed from the air dispensing ducts.

Openings 328 in the upper air dispensing ducts 325a and 325b are preferably larger in diameter than the openings 329 formed in the lower air dispensing duct 325c.

It has been observed that air delivered through an orifice can be projected a distance about eight times the diameter of the opening before it loses its integrity and significantly diffuses. In a preferred embodiment of the invention, openings in the upper air dispensers are preferably, for example, about one inch in diameter and the upper surface of the food product is in a range between about two inches and eight inches from the lower surfaces of the oscillating ducts 325a and 325b.

Openings formed in the lower jet finger, in the illustrated embodiment, are configured to impinge against a lower pan surface constructed of thermally conducted material. Thus, the lower tapered duct 325c is provided with smaller openings 329 spaced closer together than those formed in the upper air dispensing ducts 325a and 325b. In a preferred embodiment, the lower tapered duct is provided with apertures having a diameter of for example one-half inch and are positioned in a range between one and four inches of the bottom of the pan supporting the food product.

In the illustrated embodiment, the pan containing the food product does not move relative to the lower air dispensing duct.

In certain applications, if heat is not conducted by the pan away from spots upon which the lower jets impinge fast enough to provide substantially uniform heating to the bottom of the food product, either the lower jet finger or the product support may be moved relative to the other for sweeping air streams across the bottom surface of the pan.

It should be readily apparent that the foraminous partition 275a, plenum wall 316 and the perforated plate 343 inside each air dispensing duct 325a and 325b creates zones of differential pressure throughout the oven compartment for enhancing and controlling air flow therethrough. The radial flow fan 310 draws air from the air conditioning chamber 315 creating an area of low pressure and delivers air into the upper and lower plenums 308a and 308b creating areas of high air pressure. The perforated plates 343 in the upper and lower air dispensing ducts 325a and 325b and in the lower air dispensing duct 325c create a slight back pressure in each air dispensing duct for maintaining substantially uniform air pressure longitudinally of each air dispensing duct even though openings 328 and 329 are formed in the air dispensing ducts.

Since the foraminous partition 275 extends around a substantial portion of the periphery of the cooking chamber 320, air is drawn along multiple paths away from the food product 30 after the air streams impinge against the surface of the food product and diffuse. This allows the spent air to be expeditiously removed from the cooking chamber while minimizing diffusion of the air streams before they impinge upon the surface of the food product.

Further, the foraminous partition 275 is easily removable from the cooking chamber when door 280 is opened for cleaning or replacement with a clean foraminous partition.

The shape and configuration of the foraminous partition 275 facilitates collection of splattered material and its position in the stream of recirculating air causes it to be maintained at a temperature which is lower than the temperature of other surfaces in the cooking chamber. It should be readily apparent that spent air which impinges against the surface of a cold food product 30 will be at a lower temperature when it passes through the foraminous partition than air in the air stream which has been heated by the heating elements 312 in the air conditioning chamber 315 and delivered through the plenum to the air dispensing ducts 325a and 325b. Airborne particles and smoke in the circulating air tends to be collected on the coolest surfaces in the oven. This prevents transfer of airborne contaminants into the air conditioning chamber 315 for accumulation on surfaces which are difficult to clean.

As noted above, passages in the foraminous partition 275 are configured to prevent the transfer of microwave energy from the cooking compartment 320 into the air conditioning compartment 315 which significantly reduces the possibility of leakage of microwave energy through openings in the air conditioning compartment through which fan motor drive shafts, electrical conductors and the like extend.

The positioning of oscillating air dispensers 325a and 325b closely adjacent opposite sides of openings 296a and 296b through which microwave energy is delivered into the cooking chamber stirs the microwave as the air dispensing ducts oscillate. Moving surfaces of the oscillating ducts also change constantly to diffuse standing waves of reflected microwave energy in the cooking compartment. Any hot spots formed by the microwave energy in the cooking compartment are diffused by the oscillating ducts as the air streams are swept through the cooking chamber to provide more uniform heating by both the microwave energy and the impinging air streams.

Since microwave energy is contained in the cooking compartment and isolated from the air conditioning compartment, fresh air may be circulated through the air conditioning compartment 315 if it is deemed expedient to do so for removing smoke and eliminating rancid odors.

The transfer of heat between temperature controlled air and a food product is enhanced by delivering temperature controlled air, substantially parallel to an axis 125a in the embodiment of FIG. 3 or axis 325x in the embodiment of FIG. 24, into the air dispensing duct because air is uniformly distributed and air pressure is substantially constant along the length of each duct. This improves the efficiency of the air flow for dispensing streams of air from the duct toward the food product in a direction generally transverse of axis 325x and generally perpendicular to the food surface.

Reciprocation of the duct about axis 325x sweeps the streams of air that impinge on discrete areas on the surface of the food product across the surface of the food product.

We claim:

1. A microwave oven for heating food products comprising:

a heating chamber;

magnetron means for delivering electro-magnetic energy into said heating chamber;

air dispensing means for dispensing air into said heating chamber;

means movably supporting said air dispensing means to direct an air stream to impinge on discrete portions of the surface of a food product in said heating chamber, said air dispensing means having microwave reflective surfaces; and means associated with said air dispensing means adapted to move said air dispensing means for sweeping said air stream through said heating chamber and for moving said microwave reflective surfaces for sweeping electro-magnetic waves through said heating chamber.

2. A microwave oven according to claim 1, said air dispensing means comprising:

at least two air dispensing ducts; and means pivotally supporting each of said air dispensing ducts in said heating chamber.

3. A microwave oven according to claim 2, said means to move said air dispensing means comprising:

drive means connected to each of said air dispensing ducts for causing said air dispensing ducts to move in unison.

4. A microwave oven according to claim 1, with the addition of:

partition means in said heating chamber dividing said heating chamber to form a cooking compartment and an air conditioning compartment, said partition means being configured to block passage of microwave energy into said air conditioning compartment while permitting flow of air from said cooking compartment into said air conditioning compartment.

5. A microwave oven according to claim 4, said partition means having a central portion forming a rear wall and extremities forming side walls configured to encircle a portion of said cooking compartment such that said air conditioning compartment extends around a major part of said cooking compartment wherein air is drawn along multiple paths toward said side walls and toward said rear wall from said cooking compartment.

6. A microwave oven according to claim 5, said partition means comprising:

a removable oven liner having a configuration approximating that of said cooking compartment such that surfaces on said removable oven liner form foraminous walls around a food product to collect splattered material resulting from heating the food product.

7. A microwave oven comprising:

a cabinet;

partition means dividing the interior of the cabinet into a cooking chamber and an air heating chamber;

air circulating means in said heating chamber to circulate air from the heating chamber through said cooking chamber;

air dispensing means having a microwave reflective surface in said cooking chamber;

means for mounting said air dispensing means to receive air from said circulating means;

means for moving said air dispensing means in said cooking chamber; and microwave heating means communicating with said cooking chamber, said partition means being adapted to prevent transfer of microwave energy from said cooking chamber to said heating chamber.

8. A microwave oven according to claim 7, with the addition of:

a container in said cooking chamber, said container having a bottom wall and upwardly extending side walls;

product support means in said container for supporting a food product having upper and lower surfaces and side surfaces such that an air passage is formed between the food product and said container; and said air dispensing means in said cooking chamber forming a region of controlled air pressure alternately adjacent opposite sides of the food product and said container side walls such that air flows between the lower surface of the food product and the bottom wall of the container.

9. A microwave oven according to claim 8, said air dispensing means having spaced orifices adapted to dispense a plurality of streams of air toward said container; and said means for moving said air dispensing means relative to said container directing at least one of said streams toward a side wall of said container such that air flow is induced through the space between the lower surface of the food product and the bottom wall of the container.

10. A microwave oven according to claim 8, said cooking chamber comprising:

a bottom wall and side walls; and means adapted to support food products spaced from said bottom wall, said means supporting the food product comprising a material which absorbs microwave energy.

11. A microwave oven according to claim 7, said air dispensing means being constructed of material which reflects microwave energy; and said means for moving said air dispensing means comprising means for oscillating said air dispensing means to diffuse microwave energy in said cooking chamber to prevent the formation of hot spots in said cooking compartment.

12. A process for heating a food product in a heating chamber comprising the steps of:

delivering microwaves into the heating chamber;

circulating air through an opening in an air dispenser having a microwave reflective surface for forming a collimated stream of air; and oscillating said air dispenser for directing said stream of air to impinge on discrete portions of the surface of the food product and for moving the microwave reflective surface for diffusing microwaves in the heating chamber.

13. A process for heating a food product according to claim 12 with the addition of the step of drawing diffused air from said stream through a foraminous partition into an air conditioning chamber, said foraminous partition retaining microwaves and airborne particles in said heating chamber.

14. A method of controlling the temperature and surface texture of a product comprising the steps of:

applying microwave energy to the product;

delivering a stream of temperature controlled air toward the product from an air circulating apparatus constructed of microwave reflective material; and rocking the air circulating apparatus about an axis for moving the air stream relative to the product and for stirring microwave energy adjacent the product.

15. A method for controlling the temperature and surface texture of a product according to claim 14 wherein the air circulating apparatus includes at least one air dispenser having a longitudinal axis; and wherein the air dispenser is mounted such that pressurized air is delivered substantially parallel to the longitudinal axis and whereby spaced streams of air are dispensed transversely of said longitudinal axis toward the product; and reciprocating said at least one air dispenser about a reciprocating axis that is generally parallel to said longitudinal axis for causing the air streams to sweep over the surface of the food product.

16. A microwave oven for heating food products comprising:

a cabinet having an interior compartment;

at least one magnetron for delivering microwave energy into said interior compartment;

front, side and rear walls on said cabinet extending around said compartment;

a plenum wall in said compartment having an opening, said plenum wall forming a plenum in said compartment;

a partition spaced from said plenum wall dividing the interior of the cabinet into a cooking chamber and an air conditioning chamber;

air circulating means for drawing air from said cooking chamber to pressurize said plenum;

at least one heater in said air conditioning chamber for controlling temperature of air in said air conditioning chamber;

a pair of air dispensers constructed of microwave reflective material, each of said air dispensers having a longitudinal axis;

means mounting said air dispensers such that pressurized air from said plenum is delivered substantially parallel to each said longitudinal axis into said air dispensers and whereby spaced streams of air are dispensed transversely of each said longitudinal axis toward a food product in said cooking chamber; and means for reciprocating each of said air dispensers about spaced reciprocating axes that are parallel to said longitudinal axes for moving the air streams relative to the food product and for stirring microwave energy in the cooking compartment adjacent the food product.

17. A microwave oven according to claim 16, said means for reciprocating said air dispensers comprising:

a connector link pivotally secured relative to each air dispenser; and means for reciprocating said connector link.

18. A microwave oven for heating food products comprising:

a heating chamber;

magnetron means for delivering electro-magnetic energy having a predetermined wave length into said heating chamber;

a sheet of microwave reflective material forming a partition in said heating chamber dividing said heating chamber to form a cooking compartment and an air conditioning compartment, said partition being configured to block passage of microwave energy having said predetermined wave length into said air conditioning compartment while permitting flow of air from said cooking compartment into said air conditioning compartment, said sheet having portions deflected outwardly in opposite directions from the plane of the sheet to form passages through which air flows in a direction generally parallel to the plane of the sheet while blocking propagation of magnetic energy waves in a direction generally perpendicular to the plane of the sheet, said passages formed by said deflected portions of said sheet being of a size relative to said wave length of electro-magnetic waves to prevent passage of electro-magnetic waves therethrough;

air dispensing means having at least one microwave reflective surface in said cooking compartment for dispensing air into said cooking compartment;

means movably supporting said air dispensing means to direct an air stream to impinge on discrete portions of the surface of a food product in said cooking compartment; and means associated with said air dispensing means adapted to move said air dispensing means for sweeping said air stream through said cooking compartment and for moving said at least one microwave reflective surface for sweeping electro-magnetic waves through said cooking compartment.

19. A microwave oven comprising:

a cabinet;

a sheet of microwave reflective material forming a partition means dividing the interior of the cabinet into a cooking chamber and an air heating chamber, air circulating means in said heating chamber to circulate air from the heating chamber through said cooking chamber; and microwave heating means communicating with said cooking chamber for delivering electro-magnetic waves having a predetermined wave length into said cooking chamber, said sheet having deflected portions extending outwardly in opposite directions from a planar portion of the sheet to form passages through which air flows in a direction generally parallel to the planer portion of the sheet while blocking propagation of magnetic energy waves in a direction generally perpendicular to the planar portion of the sheet, said passages formed by said deflected portions of said sheet being of a size relative to the wave length of electro-magnetic waves to prevent passage of electro-magnetic waves therethrough to prevent transfer of microwave energy from said cooking chamber to said heating chamber.

* * * * *